(12) United States Patent
Yoshida et al.

(10) Patent No.: US 9,004,221 B2
(45) Date of Patent: *Apr. 14, 2015

(54) TORQUE SENSOR AND POWER STEERING SYSTEM USING THE TORQUE SENSOR

(71) Applicant: Hitachi Automotive Systems Steering, Ltd., Hiki-gun, Saitama (JP)

(72) Inventors: Osamu Yoshida, Yokohama (JP); Tatsuyoshi Maruyama, Atsugi (JP); Kiyotaka Shirakubo, Ayase (JP); Kohtaro Shino, Isehara (JP); Makoto Kimura, Yokohama (JP)

(73) Assignee: Hitachi Automotive Systems Steering, Ltd., Hiki-gun (JP)

( * ) Notice: Subject to any disclaimer, the term of this patent is extended or adjusted under 35 U.S.C. 154(b) by 45 days.

This patent is subject to a terminal disclaimer.

(21) Appl. No.: 13/851,568

(22) Filed: Mar. 27, 2013

(65) Prior Publication Data

US 2014/0076654 A1 Mar. 20, 2014

(30) Foreign Application Priority Data

Sep. 14, 2012 (JP) ................. 2012-202207

(51) Int. Cl.
*B62D 5/04* (2006.01)
*G01L 3/10* (2006.01)
(Continued)

(52) U.S. Cl.
CPC .............. *B62D 5/0463* (2013.01); *G01L 3/101* (2013.01); *B62D 6/10* (2013.01); *G01L 5/221* (2013.01); *G01L 3/104* (2013.01)

(58) Field of Classification Search
CPC ......... G01L 3/101; G01L 5/221; G01L 3/102; G01L 3/10; B62D 6/10
USPC .................................................. 180/443–446
See application file for complete search history.

(56) References Cited

U.S. PATENT DOCUMENTS 6,912,923 B2    7/2005  Froehlich et al.
(Continued)

FOREIGN PATENT DOCUMENTS

JP          2004-309463 A      11/2004

OTHER PUBLICATIONS

U.S. Appl. No. 13/851,585, filed Mar. 27, 2013, Hitachi Automotive Systems Steering, Ltd.

*Primary Examiner* — Joseph Rocca
*Assistant Examiner* — Marlon Arce
(74) *Attorney, Agent, or Firm* — Foley & Lardner LLP

(57) ABSTRACT

Torque sensor detects torque of steering shaft formed by first and second shafts which are connected through torsion bar. Torque sensor has: a magnetic member provided at the first shaft and having magnetic poles alternately arranged in circumferential direction concentrically with rotation axis; a first yoke member provided at the second shaft and having (a) first nail portions arranged concentrically with the rotation axis and facing the magnetic member in radial direction and (b) a first ring portion; a second yoke member provided at the second shaft and having (c) second nail portions arranged concentrically with the rotation axis so that the first and second nail portions are alternately arranged in the circumferential direction and the second nail portions face the magnetic member in the radial direction and (d) a second ring portion arranged to be separated from and face the first ring portion; and a magnetic sensor.

19 Claims, 15 Drawing Sheets

(51) Int. Cl.
   *B62D 6/10*   (2006.01)
   *G01L 5/22*   (2006.01)

(56) References Cited

U.S. PATENT DOCUMENTS

| | | | |
|---|---|---|---|
| 6,959,612 B2 * | 11/2005 | May | 73/862.331 |
| 7,562,590 B2 * | 7/2009 | Tokumoto et al. | 73/862.331 |
| 2002/0060105 A1 * | 5/2002 | Tominaga et al. | 180/443 |
| 2004/0031332 A1 * | 2/2004 | May | 73/862.335 |
| 2004/0194560 A1 | 10/2004 | Froehlich et al. | |
| 2010/0084215 A1 * | 4/2010 | Sakatani et al. | 180/444 |
| 2014/0076655 A1 * | 3/2014 | Yoshida et al. | 180/446 |

\* cited by examiner

OUTPUT OF MAGNETIC SENSOR

RELATIVE ANGLE BETWEEN YOKE MEMBERS AND PERMANENT MAGNET

TORQUE SENSOR AND POWER STEERING SYSTEM USING THE TORQUE SENSOR

BACKGROUND OF THE INVENTION

The present invention relates to a torque sensor that detects a steering torque of a driver and a power steering system using the torque sensor. The present invention is applied to the power steering system of a vehicle etc.

For instance, as a related art torque sensor applied to the power steering system of the vehicle, it has been disclosed in Japanese Patent Provisional Publication No. 2004-309463 (hereinafter is referred to as "JP2004-309463").

A brief explanation of a configuration of the torque sensor in JP2004-309463 will be given here.

The torque sensor has a magnetic member, first and second yoke members, first and second magnetic flux concentrators and a magnetic sensor.

A steering shaft is formed by two shaft members that are relatively rotatably connected to each other through a torsion bar.

The magnetic member is fixed onto an outer periphery of one shaft member of the steering shaft, and has a plurality of magnetic poles in a circumferential direction.

The first and second yoke members are a pair of ring members formed by soft magnetic material, and are fixed onto an outer periphery of the other shaft member of the steering shaft through a certain holder. Each of these ring-shaped first and second yoke members has a plurality of nail portions (fingernails) that extend in a radially inward direction, and the first and second yoke members are arranged so that the nail portions of the first yoke member and the nail portions of the second yoke member face each other (or are opposite to each other) in an axial direction.

The first and second magnetic flux concentrators are each arranged at a part of area, in the circumferential direction, of the first and second yoke members so that the first and second magnetic flux concentrators face each other (or are opposite to each other) between the first and second yoke members in the axial direction. The first and second magnetic flux concentrators are a pair of magnetic flux concentrators by which magnetic field is generated between the yoke members.

The magnetic sensor is accommodated in an air gap formed between the first and second magnetic flux concentrators, and detects magnetic flux that passes between these first and second magnetic flux concentrators.

The torque sensor of JP2004-309463 detects a torque that is inputted to the steering shaft, according to change of the magnetic flux (magnetic flux density) detected by the magnetic sensor.

SUMMARY OF THE INVENTION

In the case of the torque sensor of JP2004-309463, however, it employs the configuration in which the nail portions of the first yoke member and the nail portions of the second yoke member are set at different axial direction positions. Because of this, if a relative axial direction position between the magnetic member and the first and second yoke members changes, there arises a difference of an air gap between the magnetic member and the yoke members. As a consequence, output characteristics of the torque sensor greatly varies, and there is a possibility that an accurate torque detection can not be performed.

It is therefore an object of the present invention to provide a torque sensor and a power steering system using the torque sensor, which is capable of performing the accurate torque detection even in the case where the relative axial direction position between the magnetic member and the yoke member changes.

According to one aspect of the present invention, a torque sensor detecting a torque generated in a rotation member that is formed by a first shaft member and a second shaft member both of which are connected through a torsion bar, the torque sensor comprises: a magnetic member provided at the first shaft member so as to rotate integrally with the first shaft member and having different magnetic poles that are alternately arranged in a circumferential direction concentrically with a rotation axis of the rotation member; a first yoke member formed by magnetic material and provided at the second shaft member so as to rotate integrally with the second shaft member, the first yoke member having (a) a plurality of first nail portions that are arranged concentrically with the rotation axis so as to face the magnetic member in a radial direction of the rotation axis and (b) a first ring portion that connects the first nail portions together; a second yoke member formed by magnetic material and provided at the second shaft member so as to rotate integrally with the second shaft member, the second yoke member having (c) a plurality of second nail portions that are arranged concentrically with the rotation axis in such a way that the first nail portions and the second nail portions are alternately arranged in the circumferential direction and the second nail portions face the magnetic member in the radial direction of the rotation axis and (d) a second ring portion that is arranged so as to be separated from and face the first ring portion and connects the second nail portions together; and a magnetic sensor having a Hall device that detects a change of magnetic field between the first ring portion and the second ring portion which occurs according to a change of a relative angle between the first and second nail portions and the magnetic member in response to torsion deformation of the torsion bar. And the torque generated in the rotation member is detected on the basis of an output signal of the magnetic sensor.

According to another aspect of the present invention, a torque sensor detecting a torque generated in a rotation member that is formed by a first shaft member and a second shaft member both of which are connected through a torsion bar, the torque sensor comprises: a magnetic member provided at the first shaft member so as to rotate integrally with the first shaft member and having different magnetic poles that are alternately arranged in a circumferential direction concentrically with a rotation axis of the rotation member; a first yoke member formed by magnetic material and provided at the second shaft member so as to rotate integrally with the second shaft member, the first yoke member having (a) a plurality of first nail portions that are arranged concentrically with the rotation axis so as to face the magnetic member in a radial direction of the rotation axis and (b) a first ring portion that connects the first nail portions together; a second yoke member formed by magnetic material and provided at the second shaft member so as to rotate integrally with the second shaft member, the second yoke member having (c) a plurality of second nail portions that are arranged concentrically with the rotation axis in such a way that, the first nail portions and the second nail portions are alternately arranged in the circumferential direction and the second nail portions are offset from the first nail portions to a side of the magnetic member to be positioned close to the magnetic member, also the second nail portions face the magnetic member in the radial direction of the rotation axis and (d) a second ring portion that is arranged so as to be separated from and face the first ring portion and connects the second nail portions together; and a magnetic sensor having a Hall device that detects a change of magnetic field between the first ring portion and the second ring portion which occurs according to a change of a relative angle between the first and second nail portions and the magnetic member in response to torsion deformation of the torsion bar. And the torque generated in the rotation member is detected on the basis of an output signal of the magnetic sensor.

According to a further aspect of the invention, a power steering system comprises: a steering mechanism having (i) a steering shaft formed by an input shaft which rotates according to a steering operation of a steering wheel and an output shaft to which a rotation of the input shaft is transmitted by being connected to the input shaft through a torsion bar and (ii) a conversion mechanism which converts a rotation of the output shaft to a steering motion of steered road wheels; a torque sensor that detects a steering torque generated in the steering shaft; and an electric motor that provides a steering force to the steering mechanism on the basis of an output signal of the torque sensor. The torque sensor has; a magnetic member provided at one of the input shaft and the output shaft so as to rotate integrally with the one shaft and having different magnetic poles that are alternately arranged in a circumferential direction concentrically with a rotation axis of the steering shaft; a first yoke member formed by magnetic material and provided at the other of the input shaft and the output shaft so as to rotate integrally with the other shaft, the first yoke member having (a) a plurality of first nail portions that are arranged concentrically with the rotation axis so as to face the magnetic member in a radial direction of the rotation axis and (b) a first ring portion that connects the first nail portions together; a second yoke member formed by magnetic material and provided at the other of the input shaft and the output shaft so as to rotate integrally with the other shaft, the second yoke member having (c) a plurality of second nail portions that are arranged concentrically with the rotation axis in such a way that the first nail portions and the second nail portions are alternately arranged in the circumferential direction and the second nail portions face the magnetic member in the radial direction of the rotation axis and (d) a second ring portion that is arranged so as to be separated from and face the first ring portion and connects the second nail portions together; and a magnetic sensor having a Hall device that detects a change of magnetic field between the first ring portion and the second ring portion which occurs according to a change of a relative angle between the first and second nail portions and the magnetic member in response to torsion deformation of the torsion bar.

The other objects and features of this invention will become understood from the following description with reference to the accompanying drawings.

BRIEF DESCRIPTION OF THE DRAWINGS

FIG. 12A is a sectional view of the torque sensor, which corresponds to the A-A cross section of FIG. 2. FIG. 12B is a longitudinal cross section taken along a B-B line of FIG. 12A.

FIG. 15A is a sectional view of the torque sensor, which corresponds to the A-A cross section of FIG. 2. FIG. 15B is a longitudinal cross section taken along a C-C line of FIG. 15A.

FIG. 18A is a sectional view of the torque sensor, which corresponds to the A-A cross section of FIG. 2. FIG. 18B is a longitudinal cross section taken along a D-D line of FIG. 18A.

DETAILED DESCRIPTION OF THE INVENTION

Embodiments of a torque sensor and a power steering system using the torque sensor of the present invention will be explained below with reference to the drawings. In the following description, examples in which the torque sensor is applied to a rack-and-pinion gear type electric power steering system of a vehicle will be explained.

Figure 1:
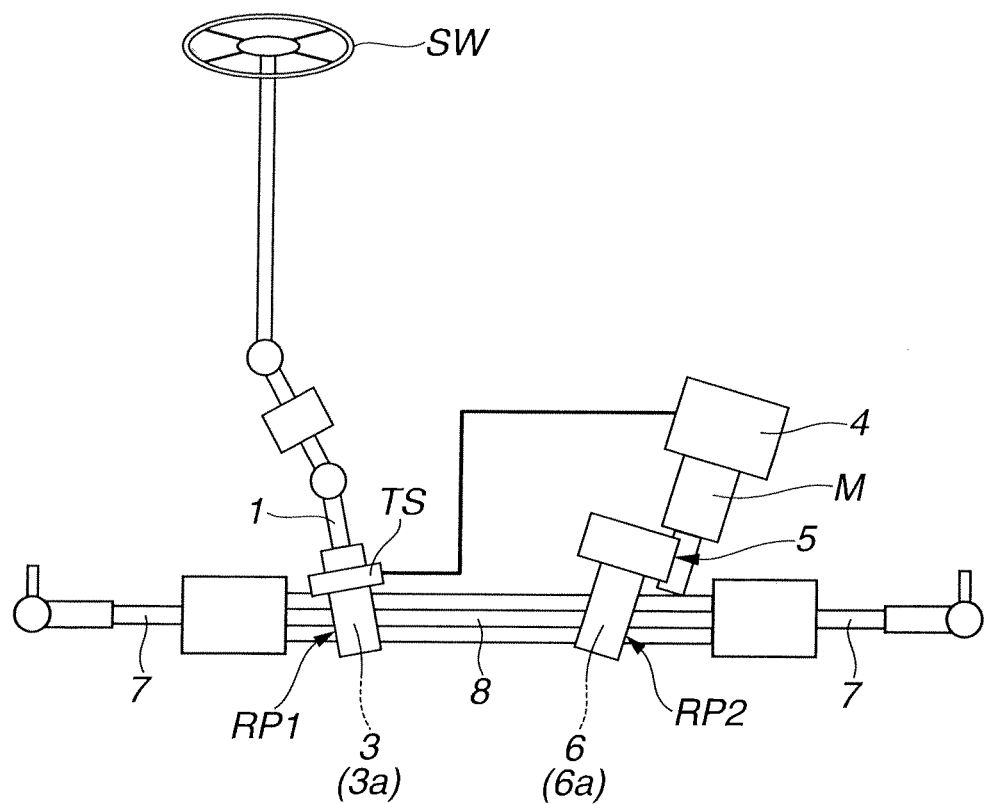
FIG. 1 is a schematic view showing a configuration of a power steering system of the present invention.

FIGS. 1 to 9 show a first embodiment of the torque sensor etc. of the present invention. As shown in FIG. 1, in an electric power steering system to which the torque sensor is applied, a steering shaft (a rotation member), which is formed by an input shaft 1 (a second shaft member in the present invention) whose one end side is connected to a steering wheel SW and a first output shaft 3 (a first shaft member in the present invention) whose one end side is relatively rotatably connected to the input shaft 1 through a torsion bar 2, is linked with steered road wheels (not shown) through a first rack-and-pinion gear mechanism RP1 that is provided at one side, in a vehicle body width direction, of the vehicle. A torque sensor TS is set at an outer periphery of the steering shaft, and an electric motor M driven and controlled by an ECU 4 on the basis of an output signal of the torque sensor TS is provided. Further, a second output shaft 6, to which the electric motor M is coupled via a certain speed reduction gear mechanism 5

(e.g. a worm gear), is linked with the steered road wheels (not shown) through a second rack-and-pinion gear mechanism RP2 that is provided at the other side, in the vehicle body width direction, of the vehicle.

The first rack-and-pinion gear mechanism RP1 has a pinion gear 3a that is provided at the other end side of the first output shaft 3 and a first rack teeth (not shown) that is provided at one end side of a rack bar 8 whose both ends are linked with the steered road wheels through tie rods 7, 7. The second rack-and-pinion gear mechanism RP2 has a second pinion gear 6a that is coupled with a top end portion of the second output shaft 6 and a second rack teeth (not shown) that is provided at the other end side of the rack bar 8.

By the above configuration, the torsion bar 2 twists on the basis of a steering torque inputted to the input shaft 1 from the steering wheel SW, and the first output shaft 3 rotates according to a rotation torque that is generated upon restoring of the torsion bar 2 from or in response to the twist (torsion deformation) of the torsion bar 2. This rotary motion of the first output shaft 3 is converted to a rectilinear motion of the rack bar 8 through the first rack-and-pinion gear mechanism RP1. On the other hand, the second output shaft 6 rotates according to a steering assist torque that is generated at the electric motor M on the basis of the steering torque, and this rotary motion of the second output shaft 6 is converted to a rectilinear motion of the rack bar 8 through the second rack-and-pinion gear mechanism RP2. With these conversion mechanisms, a direction of the steered road wheels is changed while being provided with a steering assist by the electric motor M.

Figure 2:
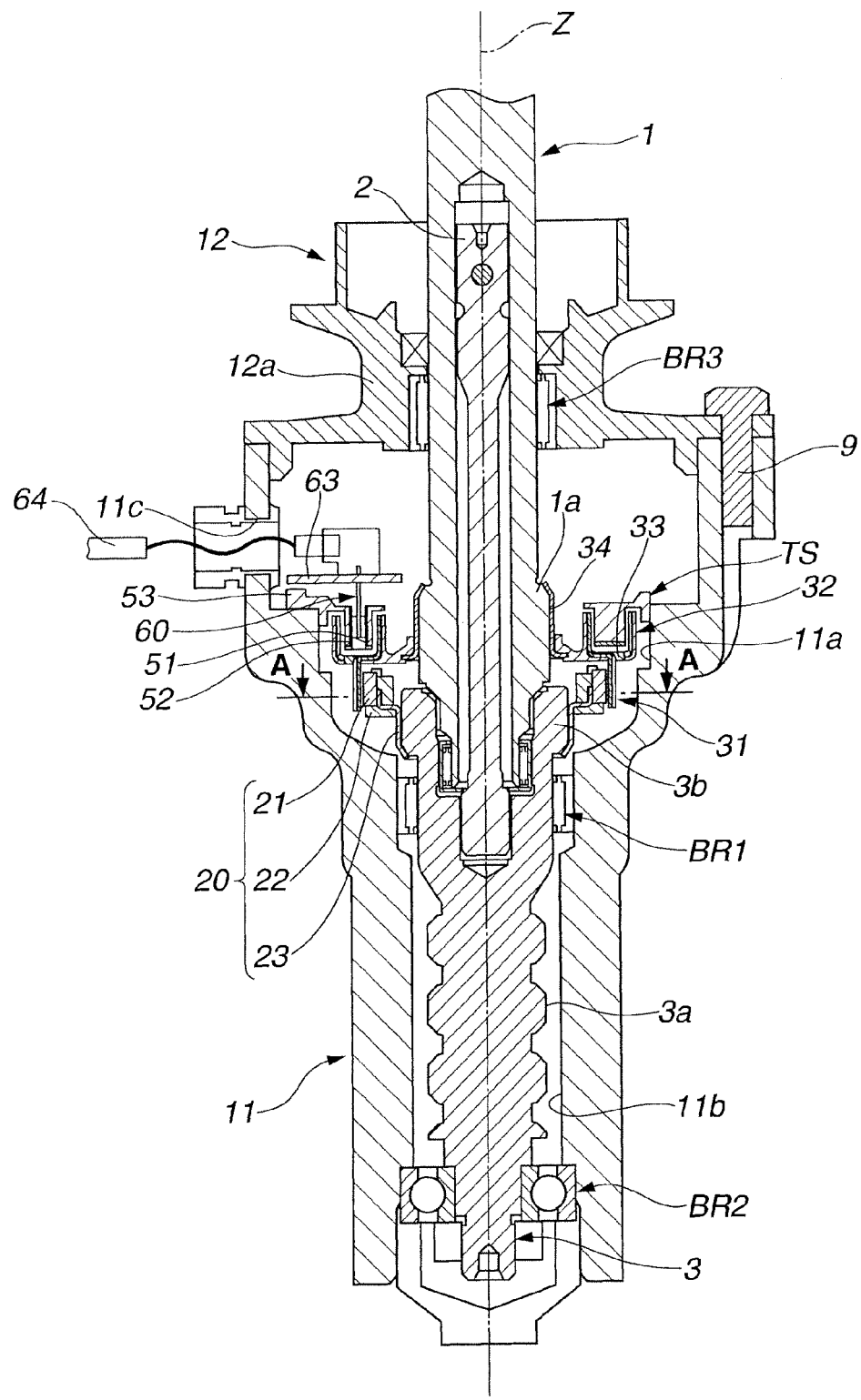
FIG. 2 is a drawing that shows a torque sensor etc. of a first embodiment, and is a longitudinal cross section of a steering system (around a first rack-and-pinion gear mechanism) shown in FIG. 1.
Figure 3:
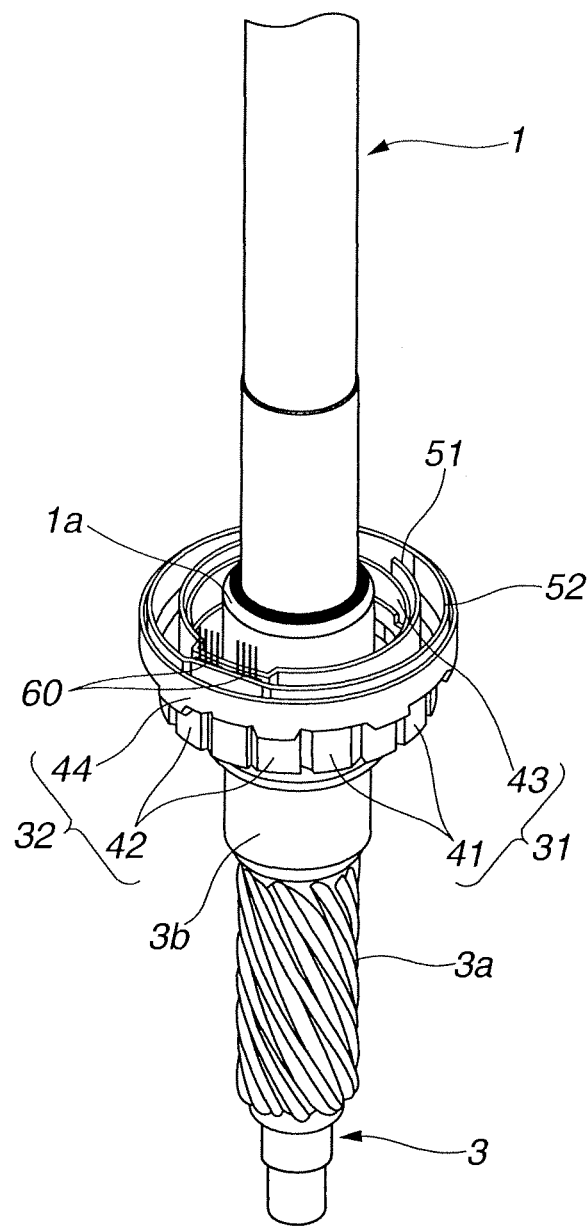
FIG. 3 is a perspective view of the torque sensor shown in FIG. 2.
Figure 4:
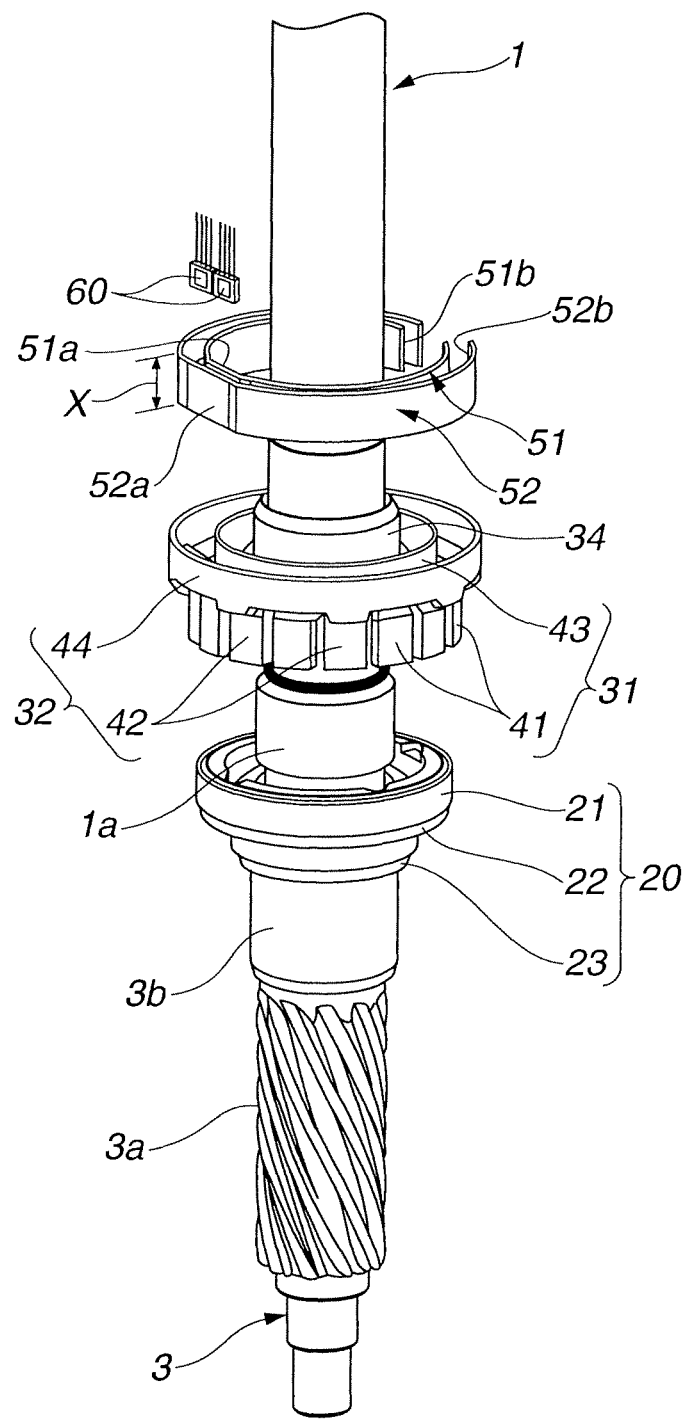
FIG. 4 is a perspective exploded view of the torque sensor shown in FIG. 3.
Figure 5:
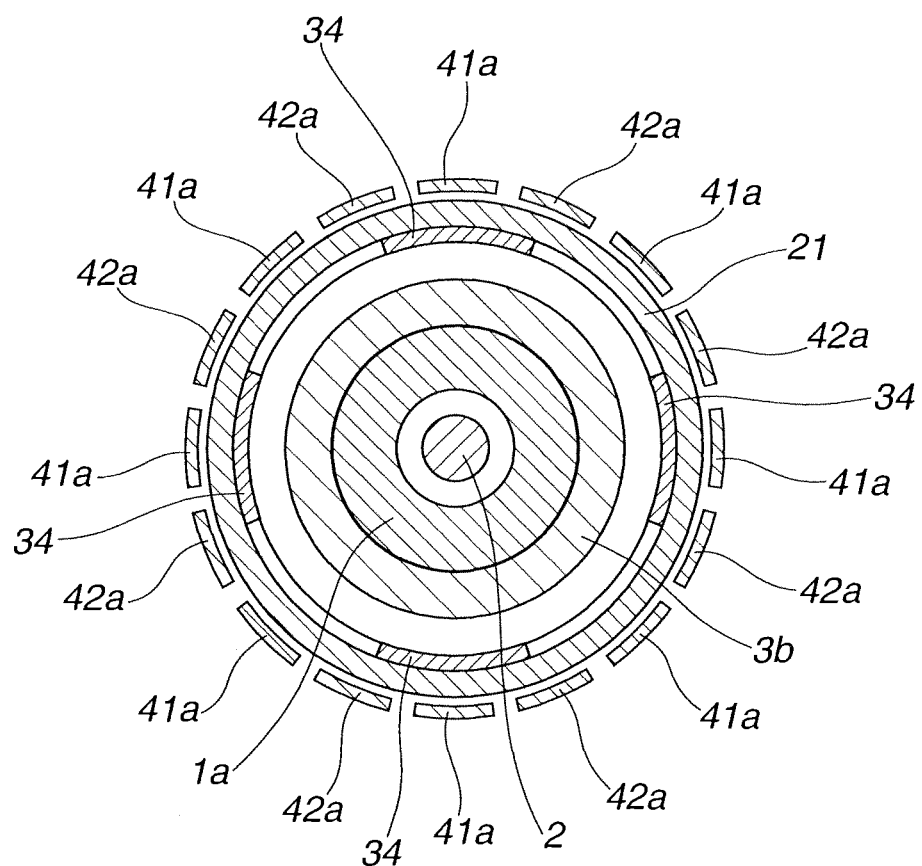
FIG. 5 is a sectional view of the torque sensor, taken along an A-A line of FIG. 2.

As shown in FIG. 2, with respect to the steering shaft, the other end side of the input shaft 1 and whole of the first output shaft 3 are housed inside a first gear housing 10 that houses therein the first rack-and-pinion gear mechanism RP1. The first gear housing 10 is formed from a pair of housing forming members of a housing body 11 and a housing cover 12 by connecting these members together with a plurality of bolts 9 arranged in a circumferential direction. The housing body 11 is a substantially cylindrical housing that houses therein the whole of the first output shaft 3. The housing cover 12 is a cover that covers or closes one end side opening that is an upper end portion of the housing body 11.

The housing body 11 has a large diameter section 11a formed stepwise by enlarging a diameter of the one end side of the housing body 11 and a small diameter section 11b having a relatively small diameter and formed by setting a diameter (an inside diameter) of the other side of the housing body 11 to be slightly greater than an outside diameter of the first output shaft 3. Then, the torque sensor TS is provided at an outer peripheral area of a connection of the input shaft 1 and the first output shaft 3 where the other end portion of the input shaft 1 which is housed in the large diameter section 11a and the one end portion of the first output shaft 3 are connected.

A pair of bearings BR1, BR2 are provided at both end portions of the small diameter section 11b of the housing body 11, and the first output shaft 3 is rotatably supported by a pair of the bearings BR1, BR2. On the other hand, a bearing BR3 is also provided at an inner periphery of a constricted portion 12a formed in a middle in an axial direction of the housing cover 12, and the input shaft 1 is rotatably supported by the bearing BR3.

As shown in FIGS. 2 to 6, the torque sensor TS mainly has a magnetic member 20, a pair of first and second yoke members 31, 32, a pair of first and second magnetic flux concentration rings 51, 52 and a pair of magnetic sensors 60, 60.

The magnetic member 20 is formed into a substantially cylindrical shape. The magnetic member 20 is fixed onto an outer periphery of the one end portion of the first output shaft 3, then rotates integrally with the first output shaft 3.

Figure 6:
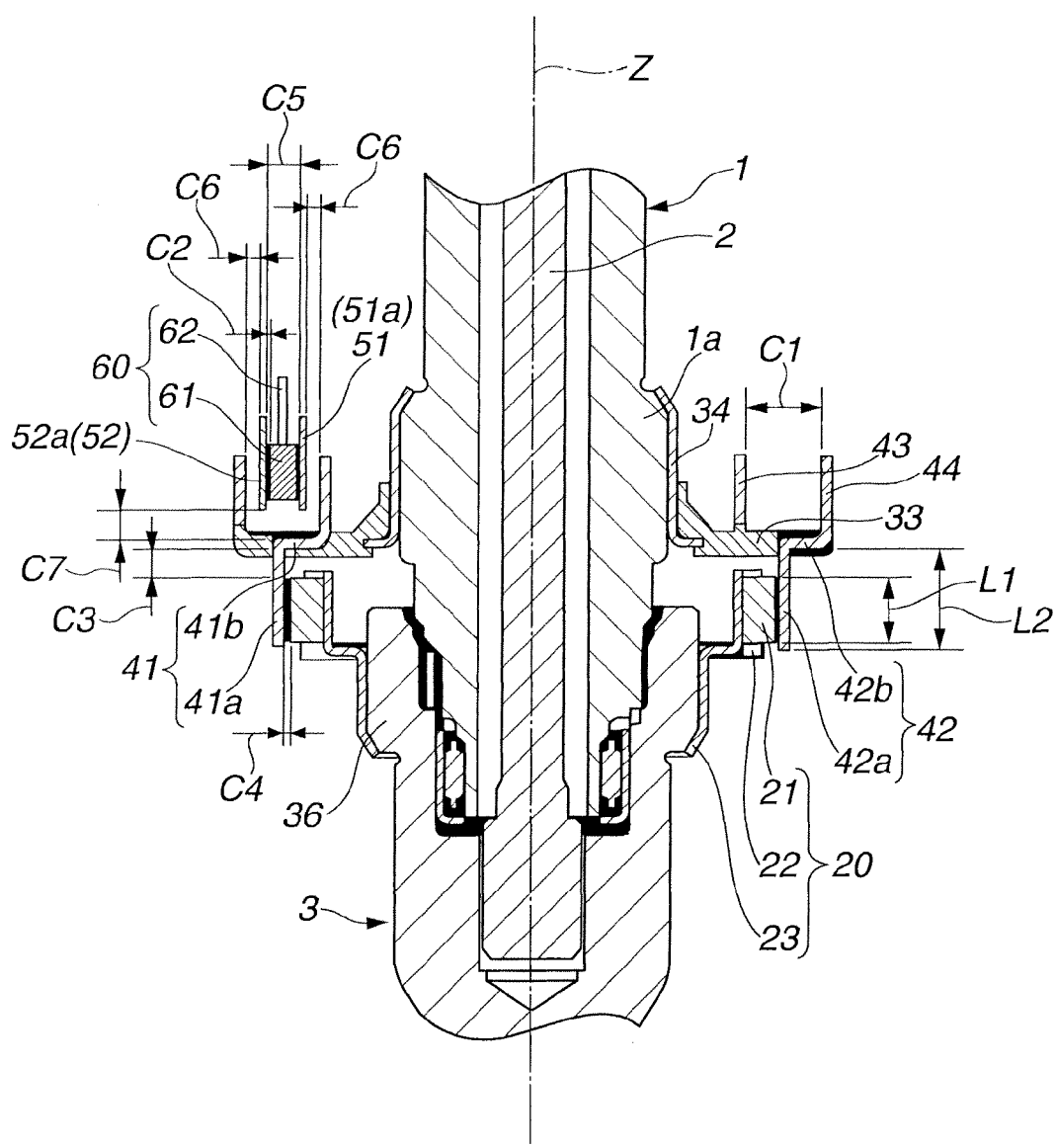
FIG. 6 is an enlarged view of a main part around the torque sensor shown in FIG. 2.

The first and second yoke members 31, 32 are formed by soft magnetic material, and have a substantially cylindrical shape. The first and second yoke members 31, 32 are both fixed onto an outer periphery of the other end portion of the input shaft 1, then rotate integrally with the input shaft 1. As can be seen in FIG. 6, the first and second yoke members 31, 32 are arranged so that each one end side (each lower end portion side in FIG. 6, which corresponds to after-mentioned first nail portion 41 and second nail portion 42) of the first and second yoke members 31, 32 faces the magnetic member 20 in a radial direction without making contact with the magnetic member 20.

The first and second magnetic flux concentration rings 51, 52 are disposed in a radial direction space C1 formed between the first and second yoke members 31, 32 at the other end side (upper end portion sides in FIG. 6, which corresponds to after-mentioned first ring portion 43 and second ring portion 44) of the first and second yoke members 31, 32. The first and second magnetic flux concentration rings 51, 52 have such substantially ring shape that magnetic field (magnetic flux) generated by the magnetic member 20 and leaking to the other end side of the first and second yoke members 31, 32 is concentrated or collected in a predetermined area.

The magnetic sensors 60, 60 are accommodated between the first and second magnetic flux concentration rings 51, 52 with the magnetic sensors 60, 60 spaced a predetermined air gap C2 from the first and second magnetic flux concentration rings 51, 52. The magnetic sensors 60, 60 detect the magnetic flux that passes between the first and second magnetic flux concentration rings 51, 52.

The magnetic member 20 has a ring-shaped permanent magnet 21 formed by magnetic material, a substantially cylindrical sleeve 23 formed by a predetermined metal material, and an insulator 22 formed by a predetermined resin material.

The permanent magnet 21 has a plurality of different magnetic poles (the north pole (N pole) and the south pole (S pole), in the present embodiment, each 8 poles, all 16 poles) alternately arranged in the circumferential direction. One end side of the sleeve 23 is joined to an inner peripheral portion of the permanent magnet 21 in an insulation manner through the resin-made insulator 22.

The magnetic member 20 is formed, as one unit, by molding (using a mold) of the permanent magnet 21 and the sleeve 23 with the resin material (the resin-made insulator 22). Then, the sleeve 23 is fitted onto a large diameter portion 3b that is formed stepwise at the outer periphery of the one end portion of the first output shaft 3, and a top edge of the sleeve 23 is laser-welded along the circumferential direction, the magnetic member 20 is thus fixed onto the outer periphery of the first output shaft 3 through the sleeve 23.

The first yoke member 31 is formed into such crank shape in vertically-cut cross section that the one end side (the lower end portion side in FIG. 6) of the first yoke member 31 has a relatively large diameter and the other end side (the upper end portion side in FIG. 6) of the first yoke member 31 has a relatively small diameter. More specifically, at the one end side (the lower end portion side in FIG. 6) of the first yoke member 31, a plurality of the first nail portions 41 are formed so that its vertically-cut cross section is such inverted L-shape that the one end side of the first yoke member 31 widens or extends in a radially outward direction. Also, the first nail portions 41 are set concentrically with the steering shaft (a rotation axis Z) so that the first nail portions 41 are arranged at predetermined circumferential direction intervals at an outer peripheral area of the magnetic member 20. On the other hand, at the other end side (the upper end portion side in FIG. 6) of the first yoke member 31, the first ring portion 43 having a ring shape that continues along the circumferential direction of the rotation axis Z is formed. The first ring portion 43 connects the first nail portions 41 together by connecting with each base portion of the first nail portions 41. The first yoke member 31 is formed by the first nail portions 41 and the first ring portion 43, described above.

The second yoke member 32 is formed into such crank shape in vertically-cut cross section that the one end side (the lower end portion side in FIG. 6) of the second yoke member 32 has a relatively small diameter and the other end side (the upper end portion side in FIG. 6) of the second yoke member 32 has a relatively large diameter. More specifically, at the one end side (the lower end portion side in FIG. 6) of the second yoke member 32, a plurality of the second nail portions 42 are formed so that its vertically-cut cross section is such inverted L-shape that the one end side of the second yoke member 32 shrinks or shortens in a radially inward direction. Also, the second nail portions 42 are set concentrically with the steering shaft (the rotation axis Z) at the outer peripheral area of the magnetic member 20 so that the second nail portions 42 are arranged at predetermined circumferential direction intervals in such a way that the second nail portion 42 and the first nail portion 41 are alternately arranged on the same circumference of a circle as that of the first nail portions 41. On the other hand, at the other end side (the upper end portion side in FIG. 6) of the second yoke member 32, the second ring portion 44 having a ring shape that continues along the circumferential direction of the rotation axis Z is formed. The second ring portion 44 connects the second nail portions 42 together by connecting with each base portion of the second nail portions 42. The second yoke member 32 is formed by the second nail portions 42 and the second ring portion 44, described above.

The first yoke member 31 and the second yoke member 32 are set so that, each first nail portion 41 and each second nail portion 42 are alternately arranged on the same circumference of the circle, also the second ring portion 44 is positioned at outer circumferential side of the first ring portion 43 and is separated from and faces the first ring portion 43 in the radial direction. In this arrangement state, adjoining or adjacent first and second nail portions 41, 42 are joined to each other through an insulator 33 that is formed by the same resin material as that of the insulator 22 of the magnetic member 20.

Further, as shown in FIG. 6, a substantially cylindrical sleeve 34 formed by predetermined metal material is provided at an inner circumferential side of the first ring portion 43 and joined to the first and second yoke members 31, 32 through the insulator 33. The first and second yoke members 31, 32 are then fixed onto the outer periphery of the input shaft 1 through the sleeve 34.

As a fixing manner of the first and second yoke members 31, 32 onto the outer periphery of the input shaft 1, as same manner as the magnetic member 20, the sleeve 34 is fitted onto a large diameter portion 1b that is formed stepwise at the outer periphery of the other end portion of the input shaft 1, and a top edge of the sleeve 34 is laser-welded along the circumferential direction, then the first and second yoke members 31, 32 are fixed onto the outer periphery of the input shaft 1 through the sleeve 34.

The first and second nail portions 41, 42 respectively have first and second axial direction extending portions 41a, 42a and first and second radial direction extending portions 41b, 42b.

The first and second axial direction extending portions 41a, 42a extend along the axial direction (in a shaft direction) of the rotation axis Z, and face the permanent magnet 21 in the radial direction.

The first and second radial direction extending portions 41b, 42b are provided so as to bend from the first and second axial direction extending portions 41a, 42a respectively, and extend along the radial direction of the rotation axis Z.

Here, as shown in FIG. 6, each axial direction length L2 of the first and second axial direction extending portions 41a, 42a is set to be at least greater than an axial direction length L1 of the permanent magnet 21. Then, the first and second axial direction extending portions 41a, 42a and the permanent magnet 21 are configured so that the permanent magnet 21 is completely enclosed or surrounded with the first and second axial direction extending portions 41a, 42a from a radial direction outer side.

Further, also regarding an air gap between the first and second nail portions 41, 42 and the permanent magnet 21, a radial direction separation amount (an air gap) C4 between each of the first and second axial direction extending portions 41a, 42a and the permanent magnet 21 is set to be sufficiently smaller than an axial direction separation amount (an air gap) C3 between each of the first and second radial direction extending portions 41b, 42b and the permanent magnet 21.

The first and second magnetic flux concentration rings 51, 52 are arc-shaped rings having both edges in the circumferential direction and extending over 180 degrees along the circumferential direction. The first and second magnetic flux concentration rings 51, 52 surround or enclose the rotation axis Z in an area over 180 degrees in the circumferential direction of the rotation axis Z. The first and second magnetic flux concentration rings 51, 52 are set so as to overlap with each other in the axial direction when viewed from the radial direction (so as to be arranged in layers each other in the radial direction), with the first magnetic flux concentration ring 51 positioned at an inner circumferential side and the second magnetic flux concentration ring 52 positioned at an outer circumferential side.

The first and second magnetic flux concentration rings 51, 52 are provided with first and second flat portions 51a, 52a (described later), each of which is formed at a part, in the radial direction, of the first and second magnetic flux concentration rings 51, 52 so as to face each other. Then, a pair of the magnetic sensors 60, 60 are accommodated in a radial direction space C5 formed by the first and second flat portions 51a, 52a.

That is, the first magnetic flux concentration ring 51 is formed into a substantially ring shape that extends or ranges over a wide area in the circumferential direction of nearly 320 degrees, also the first magnetic flux concentration ring 51 is provided, at an opposite side (at a position symmetrical about a center) to a first cutting portion 51b formed by being cut in the circumferential direction, with the first flat portion 51a that protrudes in the radially outward direction and has a rectangular shape in horizontally-cut cross section.

The second magnetic flux concentration ring 52 is formed into a substantially ring shape that extends or ranges over an area in the circumferential direction of nearly 290 degrees that is narrower than the first magnetic flux concentration ring 51, also the second magnetic flux concentration ring 52 is provided, at an opposite side (at a position symmetrical about a center) to a second cutting portion 52b formed by being cut in the circumferential direction, with the second flat portion 52a that is formed so as to be flat by being pressed in the radially inward direction.

Here, the first and second magnetic flux concentration rings 51, 52 are formed so that, a circumferential direction area of the first cutting portion 51b of the first magnetic flux concentration ring 51 positioned at the inner circumferential side is narrower, and a circumferential direction area of the second cutting portion 52b of the second magnetic flux concentration ring 52 positioned at the outer circumferential side is wider. Thus, both circumferential lengths of the first and second magnetic flux concentration rings 51, 52 are substantially equal to each other. As a consequence, magnetic path resistances between the first and second magnetic flux concentration rings 51, 52 are equalized.

The first and second magnetic flux concentration rings 51, 52 are joined to each other through an insulator 53 (see FIG. 2) that is formed by the same resin material as that of the insulators 22 and 33 of the magnetic member 20 and the first and second yoke members 31, 32. Also, the first and second magnetic flux concentration rings 51, 52 are fixed to the large diameter section 11a of the housing body 11 through the insulator 53 by a certain fixing manner (e.g. with bolts) so that at least a part of an axial direction area X (see FIG. 4) of the first and second magnetic flux concentration rings 51, 52 overlaps with the first and second ring portions 43, 44 in the axial direction when viewed from the radial direction (at least a part of an axial direction area X of the first and second magnetic flux concentration rings 51, 52 and the first and second ring portions 43, 44 are arranged in layers in the radial direction) between the first and second ring portions 43, 44.

Further, when taking account of a position relationship with the permanent magnet 21, the first and second magnetic flux concentration rings 51, 52 are configured so that, in order for an axial direction separation amount between the first and second magnetic flux concentration rings 51, 52 and the permanent magnet 21 to be sufficiently great as compared with an air gap C6 of a radial direction separation amount between the first and second magnetic flux concentration rings 51, 52 and the first and second ring portions 43, 44, the air gap C6 is sufficiently smaller than an axial direction separation amount C7 between the first and second magnetic flux concentration rings 51, 52 and the first and second radial direction extending portions 41b, 42b of the first and second nail portions 41, 42.

As mentioned above, a pair of the magnetic sensors 60, 60 are accommodated in the radial direction space C5 between the first and second magnetic flux concentration rings 51, 52. Each of the magnetic sensors 60, 60 has a detecting portion 61 that is a Hall IC and a connecting terminal 62.

The detecting portion 61 has thereinside a Hall device and detects, by the Hall device, the magnetic field (the magnetic flux) that passes between the first and second magnetic flux concentration rings 51, 52 (between the first and second flat portions 51a, 52a).

The connecting terminal 62 is a terminal to connect the detecting portion 61 to a control board 63 (a circuit board, see FIG. 2) located above the torque sensor TS.

That is, each magnetic sensor 60 itself is secured by being connected to the control board 63 through the connecting terminal 62, and the magnetic sensors 60, 60 are accommodated in the radial direction space C5 between the first and second magnetic flux concentration rings 51, 52 (the first and second flat portions 51a, 52a) with the magnetic sensors 60, 60 spaced the predetermined air gap C2 from first and second magnetic flux concentration rings 51, 52 (the first and second flat portions 51a, 52a). The magnetic sensors 60, 60 detect, by using the Hall effect by the Hall device, magnetic flux density that passes between the first and second magnetic flux concentration rings 51, 52 by the detecting portions 61, 61. Then, a torque operation in the control board 63 is performed using an output signal that changes according to the detected magnetic flux density from the detecting portions 61, 61.

Here, as shown in FIG. 2, the control board 63 is connected to the ECU 4 (see FIG. 1) through a board-to-board connector 64 that is drawn to an inside of the housing body 11 via a window hole 11c formed on a side surface of the large diameter section 11a of the housing body 11.

Next, function and effect of the torque sensor TS of the first embodiment will be explained with reference to FIGS. 1 to 6.

According to the torque sensor TS configured as above, when the steering torque is not generated between the input shaft 1 and the first output shaft 3 and the steering shaft is in a neutral position state, each boundary between the magnetic poles of the permanent magnet 21 is positioned exactly in a middle position in the circumferential direction between the first and second nail portions 41, 42, then magnetic path resistances of the permanent magnet 21 with respect to the first and second nail portions 41, 42 are equal to each other. As a result, the magnetic field generated in the permanent magnet 21 is short-circuited between the first and second nail portions 41, 42, and the magnetic field does not leak to the first and second ring portions 43, 44. The magnetic flux of the magnetic field is thus not detected by each magnetic sensor 60.

Subsequently, when the steering wheel SW is turned by driver's steering operation and the steering torque acts on the input shaft 1 (the steering torque is generated between the input shaft 1 and the first output shaft 3), each boundary between the magnetic poles of the permanent magnet 21 shifts to one side in the circumferential direction of the first and second nail portions 41, 42, then magnetic path resistance of the one side to which each boundary shifts in the circumferential direction, among the magnetic path resistances of the permanent magnet 21 with respect to the first and second nail portions 41, 42, becomes large. As a result, the magnetic field generated in the permanent magnet 21 leaks to the first and second ring portions 43, 44 and flows to adjacent magnetic poles through the first and second ring portions 43, 44. As a consequence, the magnetic flux passes from one side to the other side between the first and second magnetic flux concentration rings 51, 52, and the magnetic flux density is detected by the magnetic sensors 60, 60. On the basis of the steering torque operated (calculated) by the output signal of the magnetic sensors 60, 60, an operation (calculation) of the steering assist torque by the electric motor M is performed in the ECU 4.

Upon the performance of the driver's steering operation, a steering direction and a providing direction of the steering assist torque are judged or determined by a direction of the magnetic flux passing between the first and second magnetic flux concentration rings 51, 52.

Here, in the present embodiment, the air gap C6 between the first and second magnetic flux concentration rings 51, 52 and the first and second ring portions 43, 44 is set to be sufficiently smaller than the axial direction separation amount C7 between the first and second magnetic flux concentration rings 51, 52 and the first and second radial direction extending portions 41b, 42b (i.e. C6<<C7). A direct influence of the magnetic field by the permanent magnet 21 on the first and second magnetic flux concentration rings 51, 52 is consequently suppressed.

Figure 7:
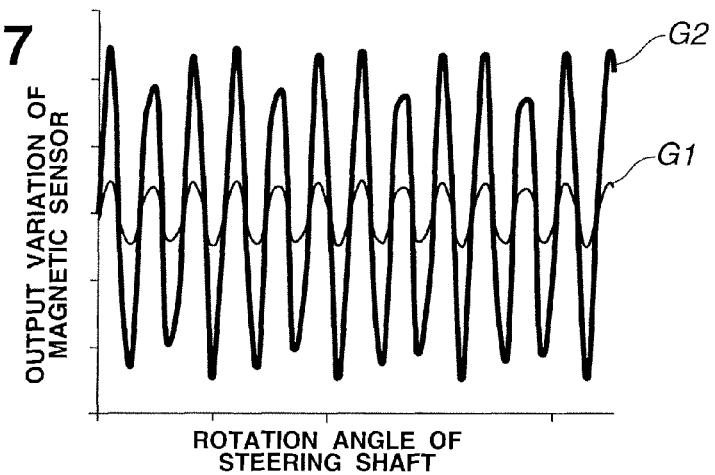
FIG. 7 is a graph showing a relationship between a rotation angle of a steering shaft and an output variation of a magnetic sensor, according to the first embodiment.

Hence, as shown in FIG. 7, in the case of the configuration (C6<<C7) of the present embodiment shown by G1, as compared with a case of a configuration of a relationship "C6>C7" shown by G2, an output variation of the magnetic sensor 60 occurring by the direct influence of the magnetic field is reduced to a minimum. It is therefore possible to improve a detection accuracy of the magnetic flux transmitted from the first and second ring portions 43, 44 to the first and second magnetic flux concentration rings 51, 52.

Further, also regarding the relationship of the air gap between the first and second nail portions 41, 42 and the permanent magnet 21, the air gap C4 between the first and second axial direction extending portions 41a, 42a and the permanent magnet 21 is set to be sufficiently smaller than the axial direction separation amount (the air gap) C3 between the first and second radial direction extending portions 41b, 42b and the permanent magnet 21 (i.e. C3>>C4). Consequently, even if there occurs a position shift of the first and second yoke members 31, 32 in the axial direction, such direct influence of the magnetic field by the permanent magnet 21 on the first and second radial direction extending portions 41b, 42b that the magnetic field of the permanent magnet 21 directly leaks to the first and second radial direction extending portions 41b, 42b, which is caused by change of the magnetic path resistance due to the position shift, is suppressed.

Figure 8:
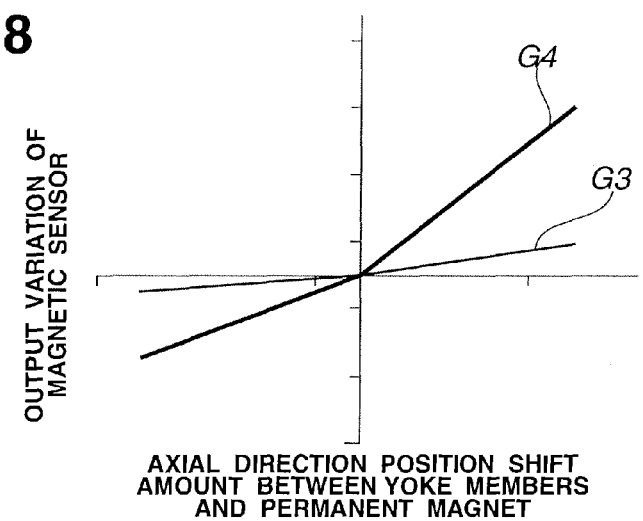
FIG. 8 is a graph showing a relationship between an axial direction position shift amount between yoke members and a permanent magnet and the output variation of the magnetic sensor, according to the first embodiment.

Hence, as shown in FIG. 8, in the case of the configuration (C3>>C4) of the present embodiment shown by G3, as compared with a case of a configuration of a relationship "C3<C4" shown by G4, an output variation of the magnetic sensor 60 occurring by the direct influence of the magnetic field is reduced to a minimum. It is therefore possible to perform an accurate torque detection according to a torsion amount of the torsion bar 2.

In addition, also regarding the overlapping amount between the first and second nail portions 41, 42 and the permanent magnet 21, the axial direction length L2 of the first and second axial direction extending portions 41a, 42a is set to be longer (greater) than the axial direction length L1 of the permanent magnet 21 (i.e. L1<L2). Consequently, even if there occurs a shift of a relative axial direction position between the permanent magnet 21 and the first axial direction extending portion 41a (the second axial direction extending portion 42a) to some extent, a certain overlapping amount of the permanent magnet 21 and the first axial direction extending portion 41a (the second axial direction extending portion 42a) can be maintained.

Figure 9:
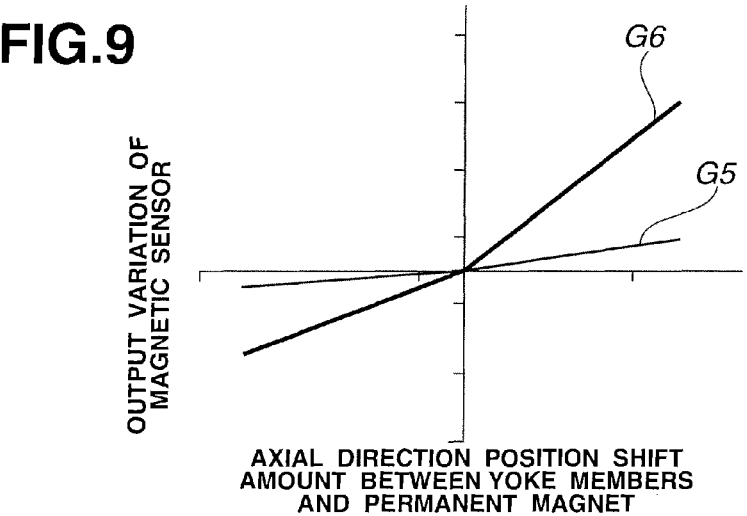
FIG. 9 is a graph showing a relationship between an axial direction position shift amount between the yoke members and the permanent magnet and the output variation of the magnetic sensor, according to the first embodiment.

Hence, as shown in FIG. 9, in the case of the configuration (L1<L2) of the present embodiment shown by G5, as compared with a case of a configuration of a relationship "L1>L2" shown by G6, variation of output characteristics of the magnetic sensor 60 in the case where the relative axial direction position between the permanent magnet 21 and the first axial direction extending portion 41a (the second axial direction extending portion 42a) changes can be effectively suppressed.

As explained above, according to the power steering system (the torque sensor TS) of the present embodiment, since the first axial direction extending portions 41a of the first nail portions 41 of the first yoke member 31 and the second axial direction extending portions 42a of the second nail portions 42 of the second yoke member 32 are concentrically arranged (on a concentric circle of the rotation axis Z) so as to face the permanent magnet 21, even in the case where the relative axial direction position between the permanent magnet 21 and both the first and second yoke members 31, 32 (both the first and second axial direction extending portions 41a, 42a) changes, there is no risk that the output characteristics of the magnetic sensor 60 will vary due to the relative position change. The accurate torque detection by the magnetic sensor 60 can therefore be achieved.

Further, in the torque sensor TS, the first and second yoke members 31, 32 are configured so as to extend in the axial direction with both the first and second nail portions 41, 42 arranged at the axial direction one end side and both the first and second ring portions 43, 44 arranged at the axial direction the other end side. Therefore, even in a case where the overlapping amount between the first and second nail portions 41, 42 (the first and second axial direction extending portions 41a, 42a) and the permanent magnet 21 is set to be large or an overlapping amount between the first and second ring portions 43, 44 is set to be large, there is no risk that each size of the first and second yoke members 31, 32 will increase in the radial direction. This contributes to size reduction, in the radial direction, of the torque sensor TS.

In addition, in the torque sensor TS, the first and second magnetic flux concentration rings 51, 52 are formed into the arc-shaped rings having both edges in the circumferential direction. Thus, there is no such risk that the magnetic field (the magnetic flux) transmitted from the first and second ring portions 43, 44 will remain or be held in a limited area of the first and second magnetic flux concentration rings 51, 52 and will circulate through the first and second magnetic flux concentration rings 51, 52 which tends to occur in a case of a closed-loop magnetic flux concentration ring. It is therefore possible to efficiently detect the change of the magnetic flux by the magnetic sensors 60, 60.

Additionally, the first and second magnetic flux concentration rings 51, 52 are configured to surround or enclose the rotation axis Z in the area over 180 degrees in the circumferential direction. Thus, even in a case where each position of the first and second magnetic flux concentration rings 51, 52 shifts in the radial direction, a detection error of the magnetic sensor 60 due to the position shift of the first and second magnetic flux concentration rings 51, 52 can be suppressed.

Figure 10:
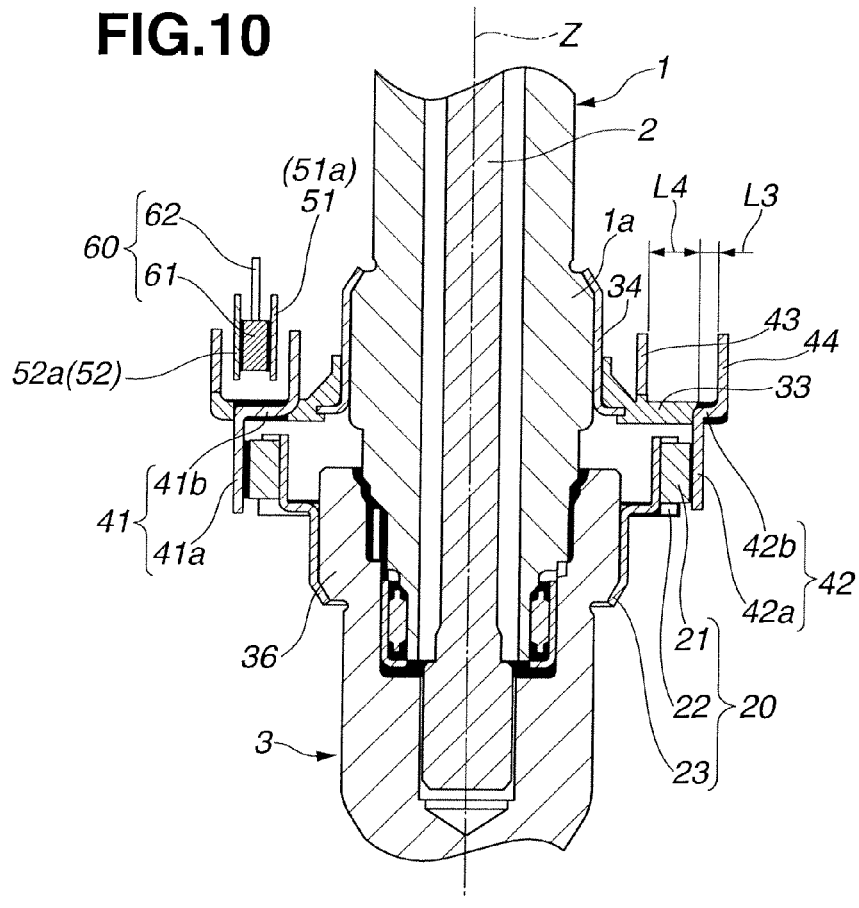
FIG. 10 is a drawing that shows a torque sensor etc. of a first modification of the first embodiment, which corresponds to FIG. 6.
Figure 11:
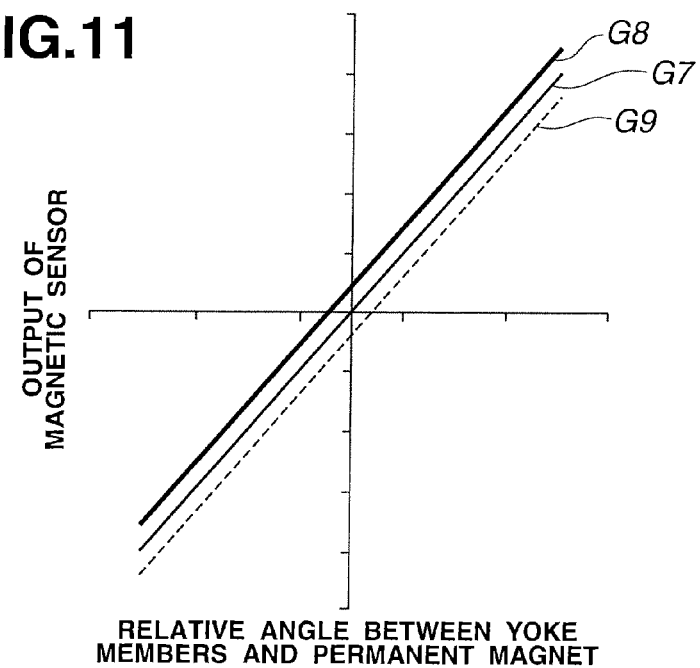
FIG. 11 is a graph showing a relationship between a relative angle between the yoke members and the permanent magnet and the output of the magnetic sensor, of the first modification.

FIGS. 10 and 11 show a first modification of the first embodiment of the torque sensor etc. of the present invention. In the first modification, the configuration of the first and second nail portions 41, 42 of the first embodiment is changed.

That is, in the present modification, a radial direction length L4 of the first radial direction extending portion 41b of the first yoke member 31 positioned at the inner circumferential side and having a relatively short circumferential direction length is set to be longer (greater) than a radial direction length L3 of the second radial direction extending portion 42b of the second yoke member 32 positioned at the outer circumferential side and having a relatively long circumferential direction length (i.e. L3<L4). With this setting, the first and second axial direction extending portions 41a, 42a shift (are offset) in the radially outward direction between the first and second yoke members 31, 32.

As described above, by the fact that the first and second nail portions 41, 42 are configured so that the first radial direction extending portion 41b of the first yoke member 31 whose ring portion is positioned at the inner circumferential side is relatively long, it is possible to adjust magnetic path resistance of the first yoke member 31 and magnetic path resistance of the second yoke member 32 which increases by an amount equivalent to the position of the second yoke member 32 that is arranged at the radially outward side with respect to the first yoke member 31.

More specifically, as shown in FIG. 11, in the case of the configuration of the present modification shown by G7, proper output characteristics of the magnetic sensor 60 are obtained. On the other hand, in a case where both radial direction lengths of the first and second radial direction extending portions 41b, 42b of the first and second yoke members 31, 32 are equal to each other as shown by G8, also in a case where the second radial direction extending portion 42b is set to be longer as shown by G9, a deviation or a difference of the output characteristics arises.

As explained above, in the present modification, since both magnetic path resistances between the first and second yoke members 31, 32 are adjusted, magnetic characteristics of the first and second yoke members 31, 32 are equalized, and the detection accuracy of the torque sensor TS can be improved.

Figure 12A:
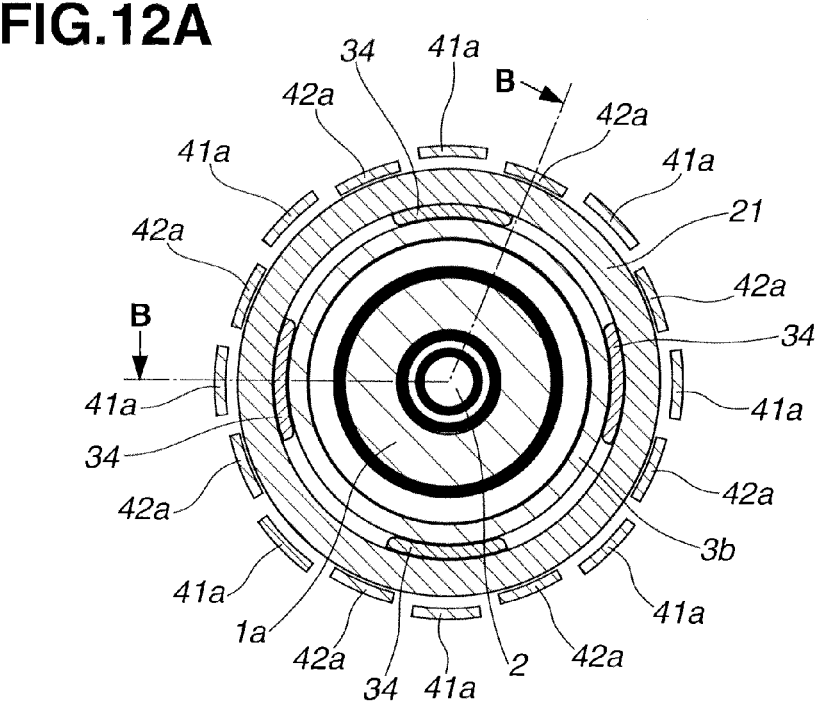
FIGS. 12A and 12B show a second modification of the torque sensor.
Figure 12B:
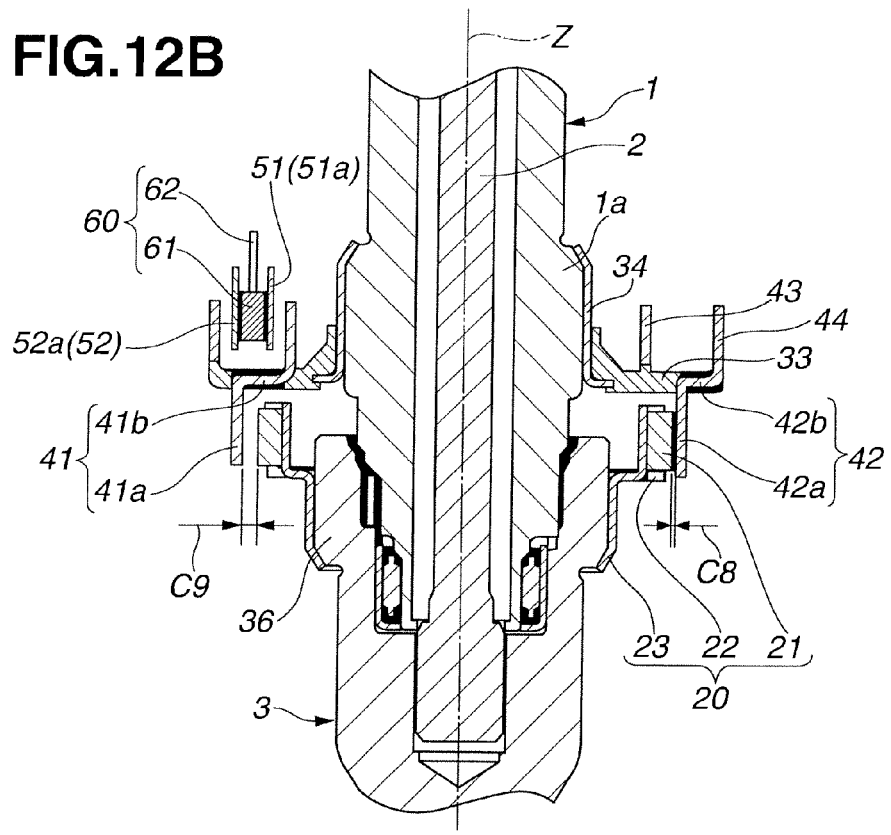
Figure 13:
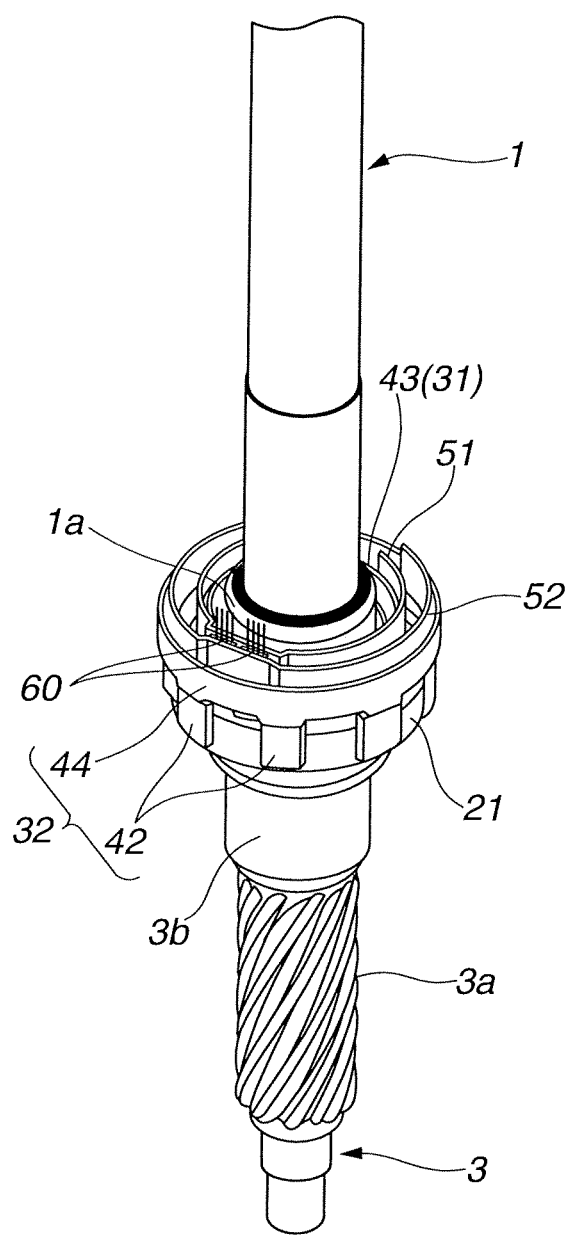
FIG. 13 is a drawing that shows a torque sensor etc. of a second embodiment, and is a perspective view of the torque sensor shown in FIG. 1.
Figure 14:
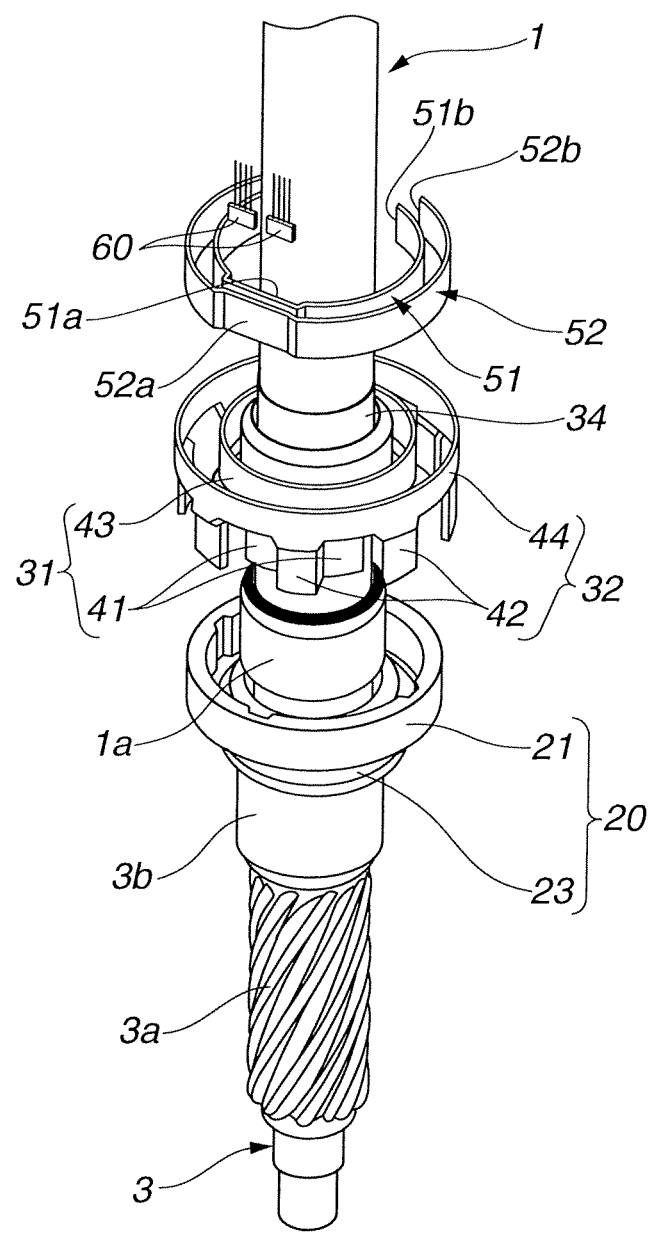
FIG. 14 is a perspective exploded view of the torque sensor shown in FIG. 13, of the second embodiment.
Figure 15A:
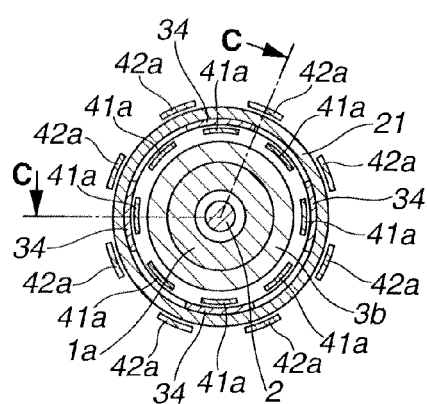
FIGS. 15A and 15B show the second embodiment.
Figure 15B:
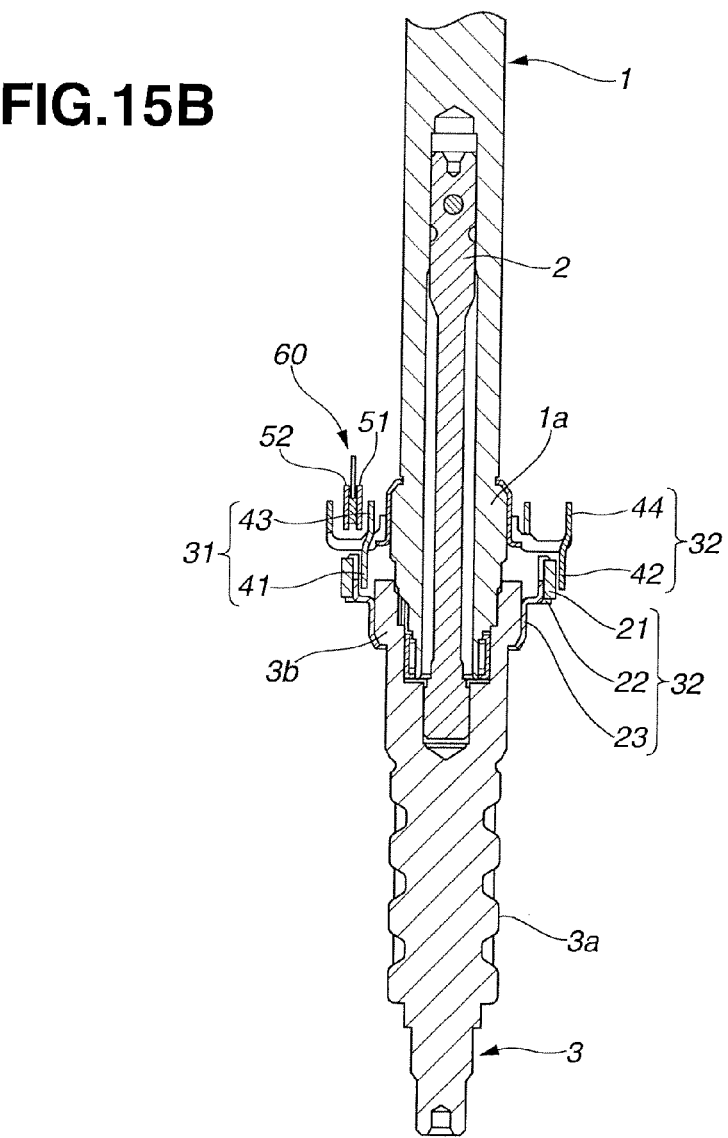
Figure 16:
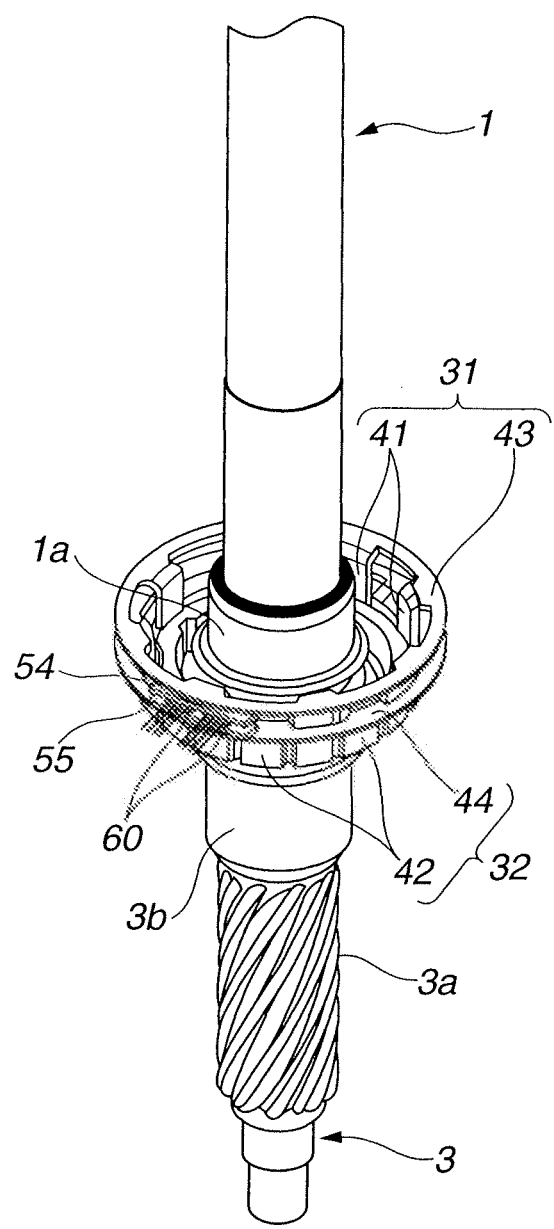
FIG. 16 is a drawing that shows a torque sensor etc. of a third embodiment, and is a perspective view of the torque sensor shown in FIG. 1.
Figure 17:
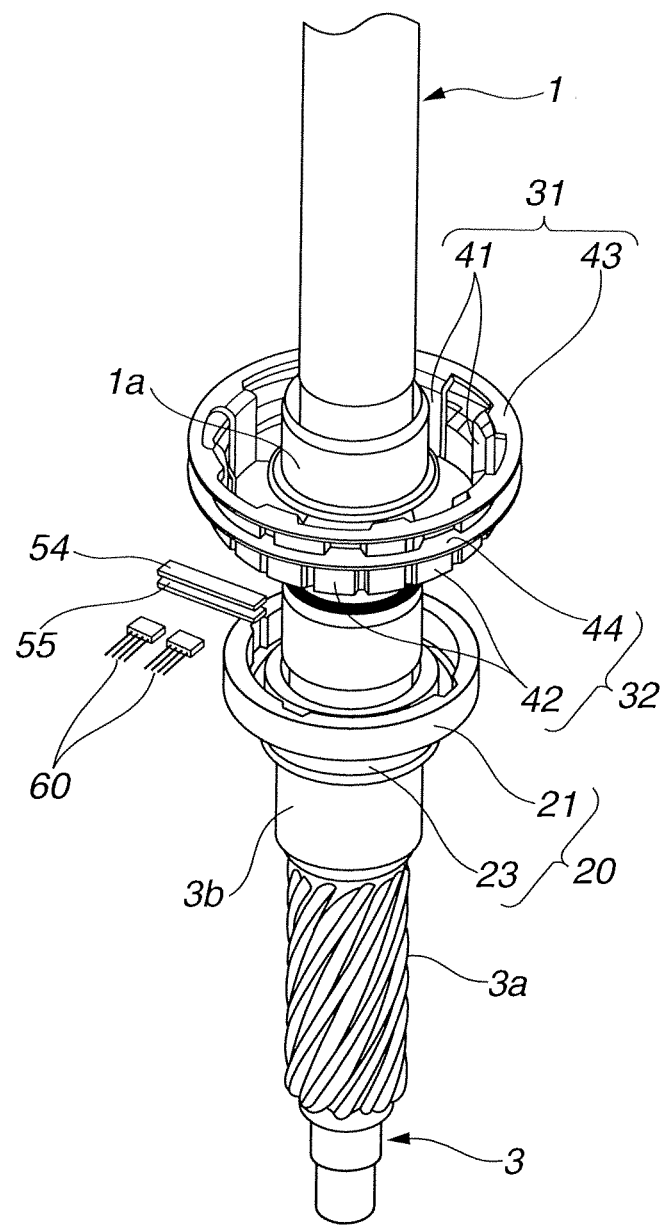
FIG. 17 is a perspective exploded view of the torque sensor shown in FIG. 16, of the third embodiment.
Figure 18A:
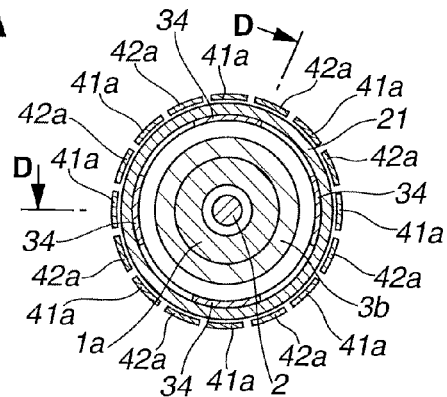
FIGS. 18A and 18B show the third embodiment.
Figure 18B:
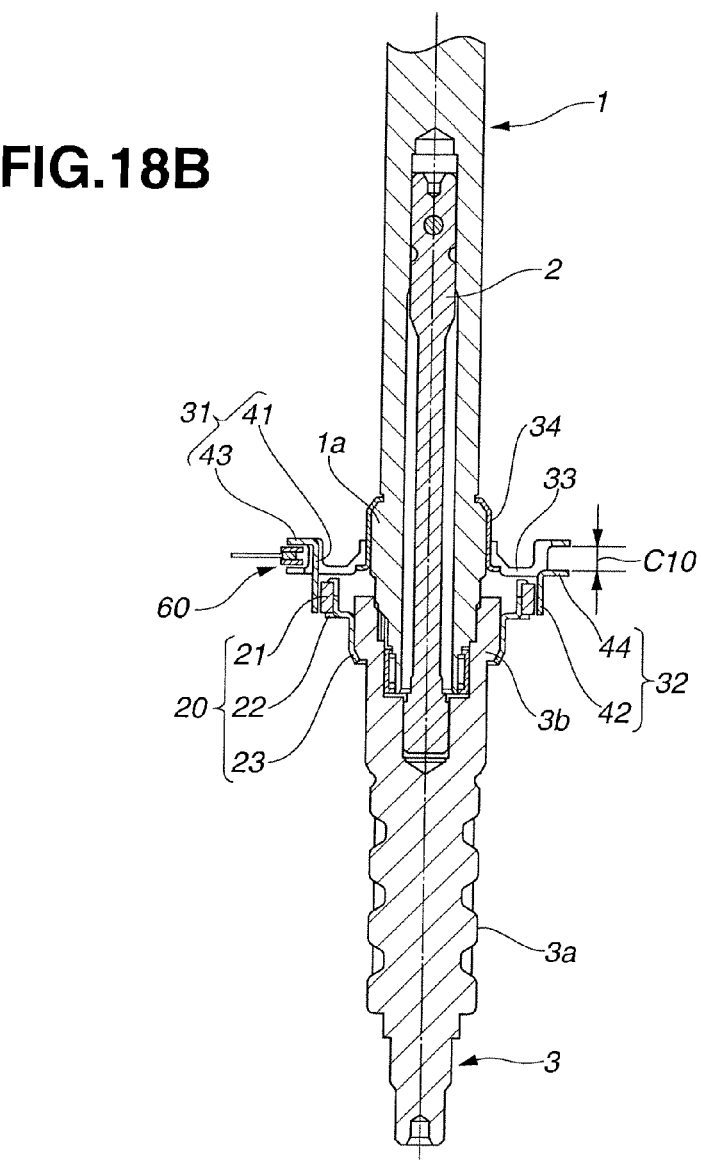

FIGS. 12A and 12B show a second modification of the first embodiment of the torque sensor etc. of the present invention. In the second modification, the radial direction position of the first nail portion 41 of the first embodiment is changed.

That is, in the present modification, the first radial direction extending portion 41b of the first yoke member 31 having the relatively short circumferential direction length by being positioned at the inner circumferential side with respect to the second yoke member 32 is set to be relatively long. With this setting, as compared with the first embodiment, the first axial direction extending portion 41a of the first nail portion 41 shifts (is offset) in the radially outward direction. In other words, as shown in FIG. 12B, an air gap C9 between the first axial direction extending portion 41a and the permanent magnet 21 is set to be greater than an air gap C8 between the second axial direction extending portion 42a and the permanent magnet 21 (i.e. C8<C9).

Besides the first modification, also by the fact that the second axial direction extending portion 42a of the second yoke member 32 whose ring portion is positioned at the outer circumferential side is positioned relatively close to the permanent magnet 21, as same as the first modification, it is possible to adjust the magnetic path resistance of the first yoke member 31 and the magnetic path resistance of the second yoke member 32 which increases by an amount equivalent to the position of the second yoke member 32 that is arranged at the radially outward side with respect to the first yoke member 31. The detection accuracy of the torque sensor TS can therefore be improved.

FIGS. 13 to 15A and 15B show a second embodiment of the torque sensor etc. of the present invention. In the second embodiment, the radial direction position of the first nail portion 41 of the first yoke member 31 of the first embodiment is changed.

That is, in the second embodiment, the radial direction length of the first radial direction extending portion 41b of the first yoke member 31 is set to be short as compared with the first embodiment. With this setting, the first axial direction extending portion 41a of the first nail portion 41 is arranged at an inner circumferential side of the permanent magnet 21.

As explained above, the first axial direction extending portion 41a of the first yoke member 31 whose ring portion is positioned at the inner circumferential side is arranged at the inner circumferential side of the permanent magnet 21, and the second axial direction extending portion 42a of the second yoke member 32 whose ring portion is positioned at the outer circumferential side is arranged at an outer circumferential side of the permanent magnet 21. Therefore, by both opposing areas between the first axial direction extending portion 41a and the permanent magnet 21 and between the second axial direction extending portion 42a and the permanent magnet 21, it is possible to adjust the magnetic path resistance of the first yoke member 31 and the magnetic path resistance of the second yoke member 32 which increases by an amount equivalent to the position of the second yoke member 32 that is arranged at the radially outward side with respect to the first yoke member 31.

That is, the magnetic path resistance of the second yoke member 32 becomes great due to the fact that the circumferential direction length (distance) of the second yoke member 32 is longer by a length equivalent to the position of the second yoke member 32 that is arranged at the radially outward side. However, by arranging the first axial direction extending portion 41a at the inner circumferential side of the permanent magnet 21, the circumferential direction length of the first axial direction extending portion 41a (the first yoke member 31) becomes short, and the opposing area between the first axial direction extending portion 41a and the permanent magnet 21 becomes small due to the shortened circumferential direction length of the first axial direction extending portion 41a, then the magnetic path resistance of the first yoke member 31 increases. Thus, it is possible to adjust the magnetic path resistance of the first yoke member 31 and the magnetic path resistance of the second yoke member 32. The magnetic characteristics of the first and second yoke members 31, 32 are then equalized, and the detection accuracy of the torque sensor TS can be improved.

FIGS. 16 to 18A and 18B show a third embodiment of the torque sensor etc. of the present invention. In the third embodiment, a configuration of the first and second ring portions 43, 44 of the first and second yoke members 31, 32 of the first embodiment is changed.

That is, in the present embodiment, regarding the first and second yoke members 31, 32, the first and second ring portions 43, 44 are formed so as to extend along the radial direction of the rotation axis Z as respective extensions of the first and second radial direction extending portions 41b, 42b, and the first and second ring portions 43, 44 face each other in the axial direction.

Further, a pair of substantially rectangular plate-shaped first and second magnetic flux concentration members 54, 55, which correspond to the first and second magnetic flux concentration rings 51, 52, are accommodated so as to face each other in an axial direction separation C10 (see FIG. 18B) formed between the first and second ring portions 43, 44. A pair of the magnetic sensors 60, 60 are accommodated between these magnetic flux concentration members 54, 55 with the magnetic sensors 60, 60 spaced the predetermined air gap C2 from the first and second magnetic flux concentration rings 51, 52.

Except for the components described above, configurations of, for example, the magnetic member 20 and the first and second nail portions 41, 42, are basically same as the first embodiment. Each component is indicated by the same reference sign in the drawings, and its explanation is omitted here.

With the above configuration, the present embodiment can obtain the same function and effect as those of the first embodiment. In addition, the present embodiment employs the configuration in which the first and second ring portions 43, 44 extend along the radial direction of the rotation axis Z as respective extensions of the first and second radial direction extending portions 41b, 42b and overlap with each other in the radial direction when viewed from the axial direction (the first and second ring portions 43, 44 are arranged in layers each other in the axial direction of the rotation axis Z). This allows reduction in size in the axial direction of the first and second yoke members 31, 32, also reduction in size in the axial direction of the torque sensor TS.

The present invention is not limited to the above embodiments and modifications. Not only configurations or structures of, for instance, the housing 10 and the first and second rack-and-pinion gear mechanism RP1, RP2, with which the present invention is not directly concerned as a feature, but also configuration or structure of the magnetic member 20, the first and second yoke members 31, 32 and the first and second magnetic flux concentration rings 51, 52 (the first and second magnetic flux concentration members 54, 55), which are the features of the present invention, can be freely changed or modified according to specifications of the vehicle and the torque sensor.

For instance, in the above embodiments and modifications, the torque sensor TS is explained with the torque sensor TS applied to a so-called dual pinion type power steering system in which the steering system and the assist system are provided independently of each other. However, as the power steering system according to the present invention which employs the torque sensor TS, as long as the power steering system is the one that is controlled on the basis of the torque detection of the torque sensor TS such as a so-called single pinion type power steering system in which the second output shaft 6 is removed and the electric motor M is coupled with the first output shaft 3 via the speed reduction gear mechanism 5, the present invention can be applied to any power steering systems.

The above embodiments and modifications can produce advantageous effects as described above. In addition to those, modified examples having substantially the same effects as the above embodiments will be explained below.

(a) In the torque sensor (TS), the magnetic sensor (60) is arranged between the first magnetic flux concentration ring (51) and the second magnetic flux concentration ring (52).

According to the torque sensor of (a), the magnetic field generated between the first magnetic flux concentration ring (51) and the second magnetic flux concentration ring (52) can be efficiently detected.

(b) In the torque sensor (TS), the first magnetic flux concentration ring (51) is positioned close to the first ring portion (43) as compared with the magnetic member (20).

According to the torque sensor of (b), the direct influence of the magnetic field by the magnetic member (20) on the first magnetic flux concentration ring (51) is suppressed, and it is possible to improve the detection accuracy of the magnetic field, received from the first ring portion (43), by the first magnetic flux concentration ring (51).

(c) In the torque sensor (TS), the first yoke member (31) has, between the first ring portion (43) and each first nail portion (41), a first radial direction extending portion (41b) that extends in a radially outward direction of the rotation axis (Z) from a first ring portion (43) side to a first nail portion (41) side by a fact that the first ring portion (43) is formed so that a diameter of the first ring portion (43) is smaller than a diameter of the concentrically arranged first nail portions (41). The second yoke member (32) has, between the second ring portion (44) and each second nail portion (42), a second radial direction extending portion (42b) that extends in a radially inward direction of the rotation axis (Z) from a second ring portion (44) side to a second nail portion (42) side by a fact that the second ring portion (44) is formed so that a diameter of the second ring portion (44) is greater than a diameter of the concentrically arranged second nail portions (42). And the first and second nail portions (41, 42) are positioned close to the magnetic member (20) as compared with the first and second radial direction extending portions (41b, 42b).

According to the torque sensor of (c), the direct influence of the magnetic field by the magnetic member (20) on the first and second radial direction extending portions (41b, 42b) is suppressed, and it is possible to perform the accurate torque detection according to the torsion amount of the torsion bar (2).

(d) In the torque sensor (TS), an axial direction length (L2) of the first and second nail portions (41, 42) is set to be greater than an axial direction length (L1) of the magnetic member (20).

According to the torque sensor of (d), the overlapping amount of the magnetic member (20) and the first and second yoke members (31, 32) can be maintained. Consequently, even if the relative axial direction position between the magnetic member (20) and the first and second yoke members (31, 32) shifts, the variation of output characteristics of the magnetic sensor (60) can be effectively suppressed.

(e) In the torque sensor (TS), the first yoke member (31) has, between the first ring portion (43) and each first nail portion (41), a first radial direction extending portion (41b) that extends in a radially outward direction of the rotation axis (Z) from a first ring portion (43) side to a first nail portion (41) side by a fact that the first ring portion (43) is formed so that a diameter of the first ring portion (43) is smaller than a diameter of the concentrically arranged first nail portions (41). The second yoke member (32) has, between the second ring portion (44) and each second nail portion (42), a second radial direction extending portion (42b) that extends in a radially inward direction of the rotation axis (Z) from a second ring portion (44) side to a second nail portion (42) side by a fact that the second ring portion (44) is formed so that a diameter of the second ring portion (44) is greater than a diameter of the concentrically arranged second nail portions (42). And the first radial direction extending portion (41b) is set to be longer than the second radial direction extending portion (42b).

According to the torque sensor of (e), by the fact that the first and second nail portions (41, 42) are configured so that the first radial direction extending portion (41b) of the first yoke member (31) whose ring portion is positioned at the inner circumferential side of the second yoke member (32) is relatively long, it is possible to adjust magnetic path resistance of the first yoke member (31) and magnetic path resistance of the second yoke member (32) which increases by the amount equivalent to the position of the second yoke member (32) that is arranged at the radially outward side with respect to the first yoke member (31). The magnetic characteristics of the first and second yoke members (31, 32) are thus equalized, and the detection accuracy of the torque sensor (TS) can be improved.

(f) In the torque sensor (TS), the first and second nail portions (41, 42) are arranged at one side of the magnetic member (20) in the radial direction of the rotation axis (Z).

According to the torque sensor of (f), since both of the first and second nail portions (41, 42) are arranged at one side of the magnetic member (20) in the radial direction of the rotation axis (Z), reduction in size in the radial direction of the first and second nail portions (41, 42) can be possible.

(g) In the torque sensor (TS), the first and second ring portions (43, 44) are arranged in layers each other in the radial direction of the rotation axis (Z). The first nail portions (41) are arranged inside the magnetic member (20) in the radial direction of the rotation axis (Z). And the second nail portions (42) are arranged outside the magnetic member (20) in the radial direction of the rotation axis (Z).

According to the torque sensor of (g), the first nail portions (41) of the first yoke member (31) whose ring portion is positioned at the inner circumferential side is arranged at the inner circumferential side of the magnetic member (20), and the second nail portions (42) of the second yoke member (32) whose ring portion is positioned at the outer circumferential side is arranged at an outer circumferential side of the magnetic member (20). Therefore, by both opposing areas between the first nail portions (41) and the magnetic member (20) and between the second nail portions (42) and the magnetic member (20), it is possible to adjust the magnetic path resistance of the first yoke member (31) and the magnetic path resistance of the second yoke member (32) which increases by the amount equivalent to the position of the second yoke member (32) that is arranged at the radially outward side with respect to the first yoke member (31). The magnetic characteristics of the first and second yoke members (31, 32) are thus equalized, and the detection accuracy of the torque sensor (TS) can be improved.

(h) In the power steering system, the first and second ring portions (43, 44) are arranged at one side in an axial direction of the rotation axis (Z) with respect to the first and second nail portions (41, 42).

According to the power steering system of (h), the first and second ring portions (43, 44) are provided and extend at one side in the axial direction of the rotation axis (Z) with respect to the first and second nail portions (41, 42), thereby reducing sizes in the radial direction of the first and second yoke members (31, 32).

(i) In the power steering system, the first and second ring portions (43, 44) are arranged in layers each other in the axial direction of the rotation axis (Z).

According to the power steering system of (i), the first and second ring portions (43, 44) are arranged in layers each other in the axial direction of the rotation axis (Z). This allows reduction in size in the axial direction of the first and second yoke members (31, 32), also reduction in size in the axial direction of the torque sensor (TS).

(j) In the power steering system, the torque sensor (TS) further has; a first magnetic flux concentration ring (51) which is formed by magnetic material and has an arc-shape that surrounds the rotation axis (Z) in an area over 180 degrees in the circumferential direction of the rotation axis (Z), the first magnetic flux concentration ring (51) being disposed between the first ring portion (43) and the second ring portion (44) and generating thereinside magnetic field by receiving magnetic field generated in the first ring portion (43); and a second magnetic flux concentration ring (52) which is formed by magnetic material and has an arc-shape that surrounds the rotation axis (Z) in an area over 180 degrees in the circumferential direction of the rotation axis (Z), the second magnetic flux concentration ring (52) being disposed between the first magnetic flux concentration ring (51) and the second ring portion (44) and generating thereinside magnetic field by receiving magnetic field generated in the second ring portion (44). And the magnetic sensor (60) detects the change of the magnetic field generated between the first magnetic flux concentration ring (51) and the second magnetic flux concentration ring (52).

According to the power steering system of (j), the first and second ring portions (43, 44) are formed into the arc-shape by cutting a part of their respective circumferences. Therefore, the magnetic field generated each ring portions (43, 44) can be held in a limited area, and it is possible to efficiently detect the change of the magnetic field by the magnetic sensors (60, 60).

Additionally, the first and second magnetic flux concentration rings (51, 52) are configured to surround or enclose the rotation axis (Z) in the area over 180 degrees in the circumferential direction. Thus, even in a case where each position of the first and second magnetic flux concentration rings (51, 52) shifts in the radial direction, a detection error of the magnetic sensor (60) due to the position shift of the first and second magnetic flux concentration rings (51, 52) can be suppressed.

(k) In the power steering system, the magnetic sensor (60) is arranged between the first magnetic flux concentration ring (51) and the second magnetic flux concentration ring (52).

According to the power steering system of (k), the magnetic field generated between the first magnetic flux concentration ring (51) and the second magnetic flux concentration ring (52) can be efficiently detected.

(l) In the power steering system, the first magnetic flux concentration ring (51) is positioned close to the first ring portion (43) as compared with the magnetic member (20).

According to the power steering system of (l), the direct influence of the magnetic field by the magnetic member (20) on the first magnetic flux concentration ring (51) is suppressed, and it is possible to improve the detection accuracy of the magnetic field, received from the first ring portion (43), by the first magnetic flux concentration ring (51).

(m) In the power steering system, the first yoke member (31) has, between the first ring portion (43) and each first nail portion (41), a first radial direction extending portion (41b) that extends in a radially outward direction of the rotation axis (Z) from a first ring portion (43) side to a first nail portion (41) side by a fact that the first ring portion (43) is formed so that a diameter of the first ring portion (43) is smaller than a diameter of the concentrically arranged first nail portions (41). The second yoke member (32) has, between the second ring portion (44) and each second nail portion (42), a second radial direction extending portion (42b) that extends in a radially inward direction of the rotation axis (Z) from a second ring portion (44) side to a second nail portion (42) side by a fact that the second ring portion (44) is formed so that a diameter of the second ring portion (44) is greater than a diameter of the concentrically arranged second nail portions (42). And the first and second nail portions (41, 42) are positioned close to the magnetic member (20) as compared with the first and second radial direction extending portions (41b, 42b).

According to the power steering system of (m), the direct influence of the magnetic field by the magnetic member (20) on the first and second radial direction extending portions (41b, 42b) is suppressed, and it is possible to perform the accurate torque detection according to the torsion amount of the torsion bar (2).

The entire contents of Japanese Patent Application No. 2012-202207 filed on Sep. 14, 2012 are incorporated herein by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. A torque sensor detecting a torque generated in a rotation member that is formed by a first shaft member and a second shaft member both of which are connected through a torsion bar, the torque sensor comprising:
   a magnetic member provided at the first shaft member so as to rotate integrally with the first shaft member and having different magnetic poles that are alternately arranged in a circumferential direction concentrically with a rotation axis of the rotation member;
   a first yoke member formed by magnetic material and provided at the second shaft member so as to rotate integrally with the second shaft member, the first yoke member having:
   (a) a plurality of first nail portions that are arranged concentrically with the rotation axis so as to face the magnetic member in a radial direction of the rotation axis; and
   (b) a first ring portion that connects the first nail portions together, a second yoke member formed by magnetic material and provided at the second shaft member so as to rotate integrally with the second shaft member, the second yoke member having:
  (c) a plurality of second nail portions that are arranged concentrically with the rotation axis in such a way that the first nail portions and the second nail portions are alternately arranged in the circumferential direction and the second nail portions face the magnetic member in the radial direction of the rotation axis; and
  (d) a second ring portion that is arranged so as to be separated from and face the first ring portion and connects the second nail portions together; and
a magnetic sensor having a Hall device that detects a change of magnetic field between the first ring portion and the second ring portion which occurs according to a change of a relative angle between the first and second nail portions and the magnetic member in response to torsion deformation of the torsion bar, and
the torque generated in the rotation member being detected on the basis of an output signal of the magnetic sensor.

2. The torque sensor as claimed in claim 1, wherein:
the first and second ring portions are arranged at one side in an axial direction of the rotation axis with respect to the first and second nail portions.

3. The torque sensor as claimed in claim 2, wherein:
the first and second ring portions are arranged in layers each other in the axial direction of the rotation axis.

4. The torque sensor as claimed in claim 3, further comprising:
  a first magnetic flux concentration ring which is formed by magnetic material and has an arc-shape that surrounds the rotation axis in an area over 180 degrees in the circumferential direction of the rotation axis, the first magnetic flux concentration ring being disposed between the first ring portion and the second ring portion and generating thereinside magnetic field by receiving magnetic field generated in the first ring portion; and
  a second magnetic flux concentration ring which is formed by magnetic material and has an arc-shape that surrounds the rotation axis in an area over 180 degrees in the circumferential direction of the rotation axis, the second magnetic flux concentration ring being disposed between the first magnetic flux concentration ring and the second ring portion and generating thereinside magnetic field by receiving magnetic field generated in the second ring portion, and wherein
the magnetic sensor detects the change of the magnetic field generated between the first magnetic flux concentration ring and the second magnetic flux concentration ring.

5. The torque sensor as claimed in claim 4, wherein:
the magnetic sensor is arranged between the first magnetic flux concentration ring and the second magnetic flux concentration ring.

6. The torque sensor as claimed in claim 5, wherein:
the first magnetic flux concentration ring is positioned close to the first ring portion as compared with the magnetic member.

7. The torque sensor as claimed in claim 4, wherein:
the first yoke member has, between the first ring portion and each first nail portion, a first radial direction extending portion that extends in a radially outward direction of the rotation axis from a first ring portion side to a first nail portion side by the first ring portion being formed so that a diameter of the first ring portion is smaller than a diameter of the concentrically arranged first nail portions,
the second yoke member has, between the second ring portion and each second nail portion, a second radial direction extending portion that extends in a radially inward direction of the rotation axis from a second ring portion side to a second nail portion side by the second ring portion being formed so that a diameter of the second ring portion is greater than a diameter of the concentrically arranged second nail portions, and
the first and second nail portions are positioned close to the magnetic member as compared with the first and second radial direction extending portions.

8. The torque sensor as claimed in claim 4, wherein:
an axial direction length of the first and second nail portions is set to be greater than an axial direction length of the magnetic member.

9. The torque sensor as claimed in claim 3, wherein:
the first yoke member has, between the first ring portion and each first nail portion, a first radial direction extending portion that extends in a radially outward direction of the rotation axis from a first ring portion side to a first nail portion side by the first ring portion being formed so that a diameter of the first ring portion is smaller than a diameter of the concentrically arranged first nail portions,
the second yoke member has, between the second ring portion and each second nail portion, a second radial direction extending portion that extends in a radially inward direction of the rotation axis from a second ring portion side to a second nail portion side by the second ring portion being formed so that a diameter of the second ring portion is greater than a diameter of the concentrically arranged second nail portions, and
the first radial direction extending portion is set to be longer than the second radial direction extending portion.

10. A torque sensor detecting a torque generated in a rotation member that is formed by a first shaft member and a second shaft member both of which are connected through a torsion bar, the torque sensor comprising:
  a magnetic member provided at the first shaft member so as to rotate integrally with the first shaft member and having different magnetic poles that are alternately arranged in a circumferential direction concentrically with a rotation axis of the rotation member;
  a first yoke member formed by magnetic material and provided at the second shaft member so as to rotate integrally with the second shaft member, the first yoke member having:
    (a) a plurality of first nail portions that are arranged concentrically with the rotation axis so as to face the magnetic member in a radial direction of the rotation axis; and
    (b) a first ring portion that connects the first nail portions together,
  a second yoke member formed by magnetic material and provided at the second shaft member so as to rotate integrally with the second shaft member, the second yoke member having:
    (c) a plurality of second nail portions that are arranged concentrically with the rotation axis such that the first nail portions and the second nail portions are alternately arranged in the circumferential direction and the second nail portions are offset from the first nail portions to a side of the magnetic member to be positioned close to the magnetic member, and the second nail portions face the magnetic member in the radial direction of the rotation axis; and (d) a second ring portion that is arranged so as to be separated from and face the first ring portion and connects the second nail portions together; and a magnetic sensor having a Hall device that detects a change of magnetic field between the first ring portion and the second ring portion which occurs according to a change of a relative angle between the first and second nail portions and the magnetic member in response to torsion deformation of the torsion bar, and the torque generated in the rotation member being detected on the basis of an output signal of the magnetic sensor.

11. The torque sensor as claimed in claim 10, wherein:
the first and second nail portions are arranged at one side of the magnetic member in the radial direction of the rotation axis.

12. The torque sensor as claimed in claim 10, wherein:
the first and second ring portions are arranged in layers each other in the radial direction of the rotation axis,
the first nail portions are arranged inside the magnetic member in the radial direction of the rotation axis, and
the second nail portions are arranged outside the magnetic member in the radial direction of the rotation axis.

13. A power steering system comprising:
a steering mechanism having:
a steering shaft formed by an input shaft which rotates according to a steering operation of a steering wheel and an output shaft to which a rotation of the input shaft is transmitted by being connected to the input shaft through a torsion bar; and
a conversion mechanism which converts a rotation of the output shaft to a steering motion of steered road wheels,
a torque sensor that detects a steering torque generated in the steering shaft; and
an electric motor that provides a steering force to the steering mechanism on the basis of an output signal of the torque sensor, and
the torque sensor having:
a magnetic member provided at the input shaft so as to rotate integrally with the input shaft and having different magnetic poles that are alternately arranged in a circumferential direction concentrically with a rotation axis of the steering shaft;
a first yoke member formed by magnetic material and provided at the output shaft so as to rotate integrally with the output shaft, the first yoke member having:
(a) a plurality of first nail portions that are arranged concentrically with the rotation axis so as to face the magnetic member in a radial direction of the rotation axis; and
(b) a first ring portion that connects the first nail portions together,
a second yoke member formed by magnetic material and provided at the output shaft so as to rotate integrally with the output shaft, the second yoke member having:
(c) a plurality of second nail portions that are arranged concentrically with the rotation axis such that the first nail portions and the second nail portions are alternately arranged in the circumferential direction and the second nail portions face the magnetic member in the radial direction of the rotation axis; and (d) a second ring portion that is arranged so as to be separated from and face the first ring portion and connects the second nail portions together; and a magnetic sensor having a Hall device that detects a change of magnetic field between the first ring portion and the second ring portion which occurs according to a change of a relative angle between the first and second nail portions and the magnetic member in response to torsion deformation of the torsion bar.

14. The power steering system as claimed in claim 13, wherein:
the first and second ring portions are arranged at one side in an axial direction of the rotation axis with respect to the first and second nail portions.

15. The power steering system as claimed in claim 14, wherein:
the first and second ring portions are arranged in layers each other in the axial direction of the rotation axis.

16. The power steering system as claimed in claim 15, wherein:
the torque sensor further includes:
a first magnetic flux concentration ring which is formed by magnetic material and has an arc-shape that surrounds the rotation axis in an area over 180 degrees in the circumferential direction of the rotation axis, the first magnetic flux concentration ring being disposed between the first ring portion and the second ring portion and generating thereinside magnetic field by receiving magnetic field generated in the first ring portion; and
a second flux concentration ring which is formed by magnetic material and has an arc-shape that surrounds the rotation axis in an area over 180 degrees in the circumferential direction of the rotation axis, the second magnetic flux concentration ring being disposed between the first magnetic flux concentration ring and the second ring portion and generating thereinside magnetic field by receiving magnetic field generated in the second ring portion, and wherein
the magnetic detects the change of the magnetic field generated between the first magnetic flux concentration ring and the second magnetic flux concentration ring.

17. The power steering system as claimed in claim 16, wherein:
the magnetic sensor is arranged the first magnetic flux concentration ring and the second magnetic flux concentration ring.

18. The power steering system as claimed in claim 17, wherein:
the first magnetic flux ring is positioned close to the first ring portion as compared with the magnetic member.

19. The power steering system as claimed in claim 16, wherein:
the first yoke member has, between the first ring portion and each first nail portion, a first radial direction extending portion that extends in a radially outward direction of the rotation axis from a first ring portion side to a first nail portion side by the first ring portion being formed so that a diameter of the first ring portion is smaller than a diameter of the concentrically arranged first nail portions,
the second yoke member has, between the second ring portion and each second nail portion, a second radial direction extending portion that extends in a radially inward direction of the rotation axis from a second ring portion side to a second nail portion side by the second ring portion being formed so that a diameter of the second ring portion is greater than a diameter of the concentrically arranged second nail portions, and the first and second nail portions are positioned close to the magnetic member as compared with the first and second radial direction extending portions.

* * * * *